United States Patent
Yasui et al.

(10) Patent No.: US 7,384,047 B2
(45) Date of Patent: Jun. 10, 2008

(54) STABILIZER CONTROL APPARATUS

(75) Inventors: Yoshiyuki Yasui, Nagoya (JP); Yuuki Ohta, Kariya (JP); Daisuke Yamada, Anjo (JP); Shuuichi Buma, Toyota (JP); Masaaki Kawashima, Gotenba (JP)

(73) Assignees: Aisin Seiki Kabushiki Kaisha, Kariya-Shi, Aichi-Ken (JP); Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 576 days.

(21) Appl. No.: 11/056,291

(22) Filed: Feb. 14, 2005

(65) Prior Publication Data

US 2005/0179220 A1    Aug. 18, 2005

(30) Foreign Application Priority Data

Feb. 12, 2004 (JP) ............................. 2004-034499

(51) Int. Cl.
*B60G 21/045* (2006.01)
(52) U.S. Cl. .................................. 280/5.506
(58) Field of Classification Search ............ 280/5.506, 280/5.507, 5.508, 5.51; 180/277, 279; 701/38, 701/41
See application file for complete search history.

(56) References Cited

U.S. PATENT DOCUMENTS

| | | |
|---|---|---|
| 6,354,607 B1 | 3/2002 | Kawashima et al. |
| 6,425,585 B1 | 7/2002 | Schuelke et al. |

FOREIGN PATENT DOCUMENTS

| | | | |
|---|---|---|---|
| EP | 1 362 721 A2 | | 11/2003 |
| EP | 1 426 208 A1 | | 6/2004 |
| JP | 2000-71737 | | 3/2000 |
| JP | 2002-518245 A | | 6/2002 |
| KR | 2005082283 A | * | 8/2005 |
| WO | WO 99/67100 | | 12/1999 |
| WO | 2004/010555 A2 | | 1/2004 |

OTHER PUBLICATIONS

European Search Report dated Jan. 18, 2006.

* cited by examiner

*Primary Examiner*—Faye M. Fleming
(74) *Attorney, Agent, or Firm*—Buchanan Ingersoll & Rooney PC

(57) ABSTRACT

In a stabilizer control apparatus for a vehicle, a stabilizer includes a pair of stabilizer bars disposed between a right wheel and a left wheel of the vehicle, and an actuator having an electric motor disposed between the stabilizer bars. A turning determination device is provided for determining a turning operation of the vehicle. And, a controller is provided for controlling the electric motor in response to the result determined by the turning determination device. The electric motor is substantially prohibited from being fed with electric current, when the turning operation of the vehicle is being decreased.

9 Claims, 20 Drawing Sheets

STABILIZER CONTROL APPARATUS

This application claims priority under 35 U.S.C. Sec. 119 to No. 2004-034499 filed in Japan on Feb. 12, 2004, the entire content of which is herein incorporated by reference.

BACKGROUND OF THE INVENTION

1. Field of the Invention

The present invention relates to a stabilizer control apparatus for a vehicle, and more particularly to an apparatus for controlling a torsional rigidity of a stabilizer disposed between a right wheel and a left wheel, by means of an electrically operated actuator.

2. Description of the Related Arts

In general, a stabilizer control apparatus for a vehicle is provided for applying an appropriate roll moment to a vehicle by means of a stabilizer while the vehicle is performing a turning operation, to reduce or restrict rolling motion of the vehicle body. For example, in the U.S. Pat. No. 6,425,585 (corresponding to International Publication No. WO9967100, and Japanese Patent Laid-open Publication No. 2002-518245), there is disclosed a system for stabilizing vehicles against rolling, with at least one slewing drive arranged between halves of the front and/or rear chassis stabilizer, thus creating an initial stress of the stabilizer halves to reduce or suppress the rolling motion and, in the event of roll, applying a counter-torque to the vehicle body as a function of output signals of a sensor for detecting a roll parameter. It is described that the object is to make possible a purely electromechanical system design for roll stabilization that will yield a reduction in the required power in steady-state or quasi-steady state driving maneuvers, and the system is characterized in that the slewing drive has an arrangement for locking swiveling of the stabilizer halves with respect to one another.

However, such locking arrangement will require a space within the slewing drive apparatus, to result in being enlarged in its longitudinal length, so that it will be difficult to mount it on the vehicle.

SUMMARY OF THE INVENTION

Accordingly, it is an object of the present invention to provide a stabilizer control apparatus which includes an actuator having an electric motor, and which is capable of reducing consumption of electric power, and reducing heat load to the electric motor or the like.

In accomplishing the above and other objects, the stabilizer control apparatus is provided with a stabilizer including a pair of stabilizer bars disposed between a right wheel and a left wheel of the vehicle, and an actuator having an electric motor disposed between the stabilizer bars. The apparatus is also provided with a turning determination device for determining a turning operation of the vehicle, and a controller for controlling the electric motor in response to the turning operation determined by the turning determination device. The controller substantially prohibits the electric motor from being fed with electric current, when the turning determination device determines that the turning operation of the vehicle is being decreased.

In the apparatus as described above, what the controller substantially prohibits the electric motor from being fed with electric current is meant by not only the case where the current is completely prohibited from being fed to the motor, but also the case where the current with a low duty ratio is being fed to the motor, thereby to substantially prohibit the current from being fed. The current can be prohibited from being fed to the motor, if a desired value provided for controlling the motor is set to be zero, or a control gain for use in the motor control is set to be zero, for example. And, the state that turning operation of the vehicle is being decreased (abbreviated as decreased turning operation) corresponds to such a state that a degree of the turning operation of the vehicle, which can be indicated by a lateral acceleration, is decreased to be close to a straight moving operation of the vehicle. Also, as described hereinafter, a state that the turning operation of the vehicle is being held (abbreviated as holding turning operation) corresponds to such a state that a degree of the turning operation of the vehicle is held to be of a constant value, and a state that the turning operation of the vehicle is being increased (abbreviated as increased turning operation) corresponds to such a state that a degree of the turning operation of the vehicle is increased.

The stabilizer control apparatus having the aforementioned stabilizer and actuator may be provided with a relative angular displacement detection device for detecting a relative angular displacement between the stabilizer bars, a desired value setting device for setting a desired value of relative angular displacement between the stabilizer bars, in response to a turning operation of the vehicle, and a controller for controlling the electric motor in response to the desired value of relative angular displacement set by the desired value setting device, by a predetermined value. In this apparatus, the controller substantially prohibits the electric motor from being fed with electric current, when the controller determines that the relative angular displacement detected by the relative angular displacement detection device is greater than the desired value of relative angular displacement set by the desired value setting device, by a predetermined value.

Or, the stabilizer control apparatus having the aforementioned stabilizer and actuator may be provided with a relative angular displacement detection device for detecting a relative angular displacement between the stabilizer bars, and a controller for controlling the electric motor in response to the relative angular displacement detected by the relative angular displacement detection device. In this apparatus, the controller substantially prohibits the electric motor from being fed with electric current, when the controller decreases the relative angular displacement.

Furthermore, the stabilizer control apparatus having the aforementioned stabilizer and actuator may be provided with a desired current setting device for setting desired electric current fed to the electric motor for actuating the electric motor, and a controller for controlling the electric motor in response to the desired electric current set by the desired current setting device. In this apparatus, the controller substantially prohibits the electric motor from being fed with electric current, when the controller decreases the desired electric current.

BRIEF DESCRIPTION OF THE DRAWINGS

The above stated object and following description will become readily apparent with reference to the accompanying drawings, wherein like referenced numerals denote like elements, and in which.

DESCRIPTION OF THE PREFERRED EMBODIMENTS

Figure 1:
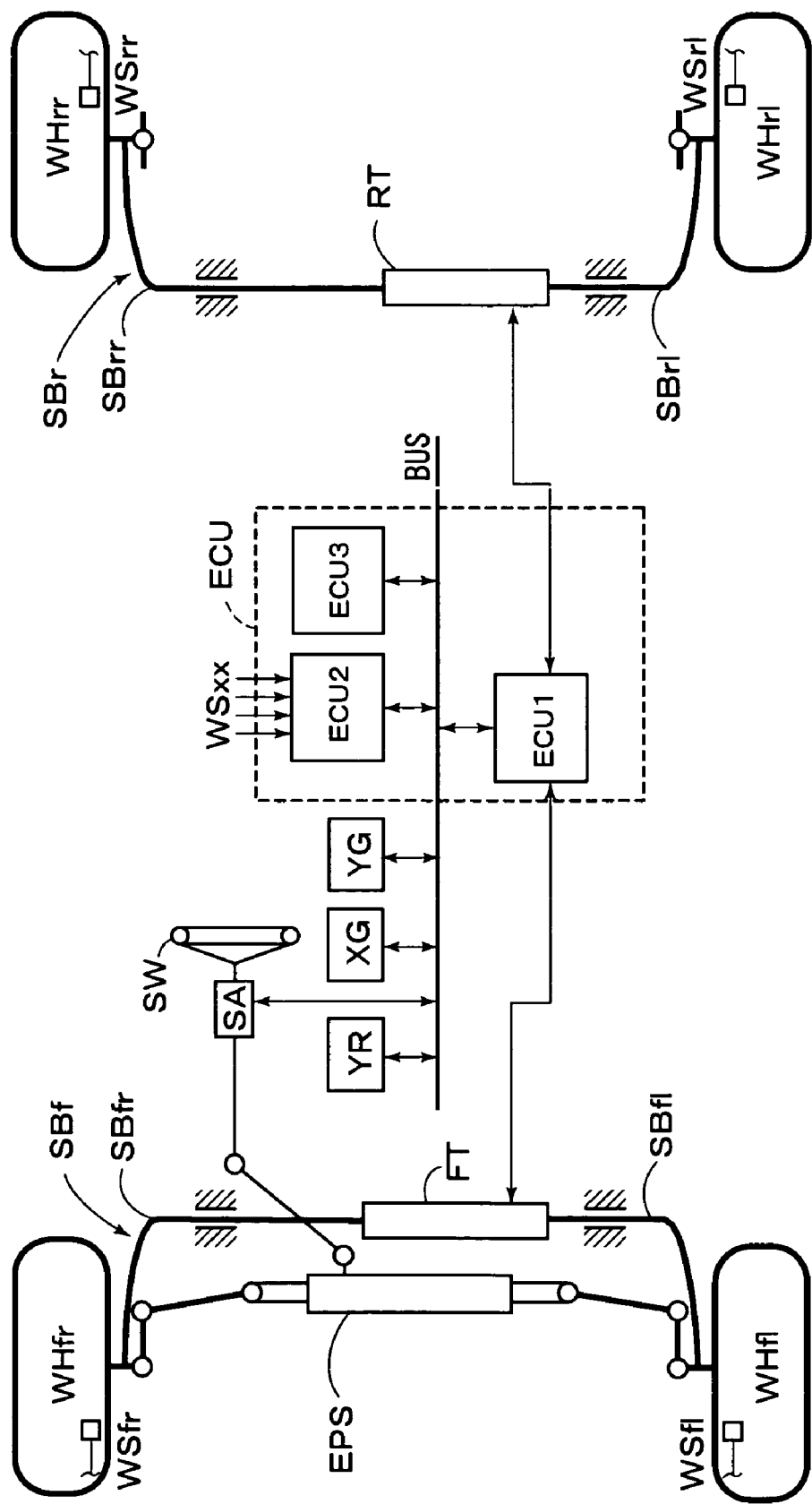
FIG. 1 is a schematic block diagram of a vehicle having a stabilizer control apparatus according to an embodiment of the present invention.

Referring to FIG. 1, there is schematically illustrated a vehicle with a stabilizer control apparatus according to an embodiment of the present invention. As shown in FIG. 1, a front stabilizer SBf and a rear stabilizer SBr are disposed to act as a torsion spring when a rolling motion is applied to a vehicle body (not shown). The front stabilizer SBf and rear stabilizer SBr are actuated by stabilizer actuators FT and RT, respectively, to control each torsional rigidity, so as to restrain a roll angle of vehicle body resulted from the rolling motion of the vehicle body. The stabilizer actuators FT and RT are controlled by a stabilizer control unit ECU1 provided in an electronic controller ECU.

As shown in FIG. 1, at each wheel WHxx of the vehicle, there is provided a wheel speed sensor WSxx, which is connected to the electronic controller ECU, and by which a signal having pulses proportional to a rotational speed of each wheel, i.e., a wheel speed signal is fed to the electronic controller ECU. "xx" designates each wheel, i.e., "fr" designates the wheel at the front right side as viewed from the position of a driver's seat, "fl" designates the wheel at the front left side, "rr" designates the wheel at the rear right side, and "rl" designates the wheel at the rear left side. Furthermore, there are provided a steering angle sensor SA for detecting a steering angle (handle angle) (δ f) of a steering wheel SW, a longitudinal acceleration sensor XG for detecting a vehicle longitudinal acceleration (Gx), a lateral acceleration sensor YG for detecting a vehicle lateral acceleration (Gy), a yaw rate sensor YR for detecting a yaw rate (Yr) of the vehicle, and so on, which are electrically connected to the electronic controller ECU. In addition to the stabilizer control unit ECU1 as described above, the electronic controller ECU includes a brake control unit ECU2, steering control unit ECU3 and the like, which are connected to a communication unit (not shown) having a CPU, ROM and RAM for communication, through a communication bus. Therefore, the information for each control system can be fed from other control systems.

Figure 2:
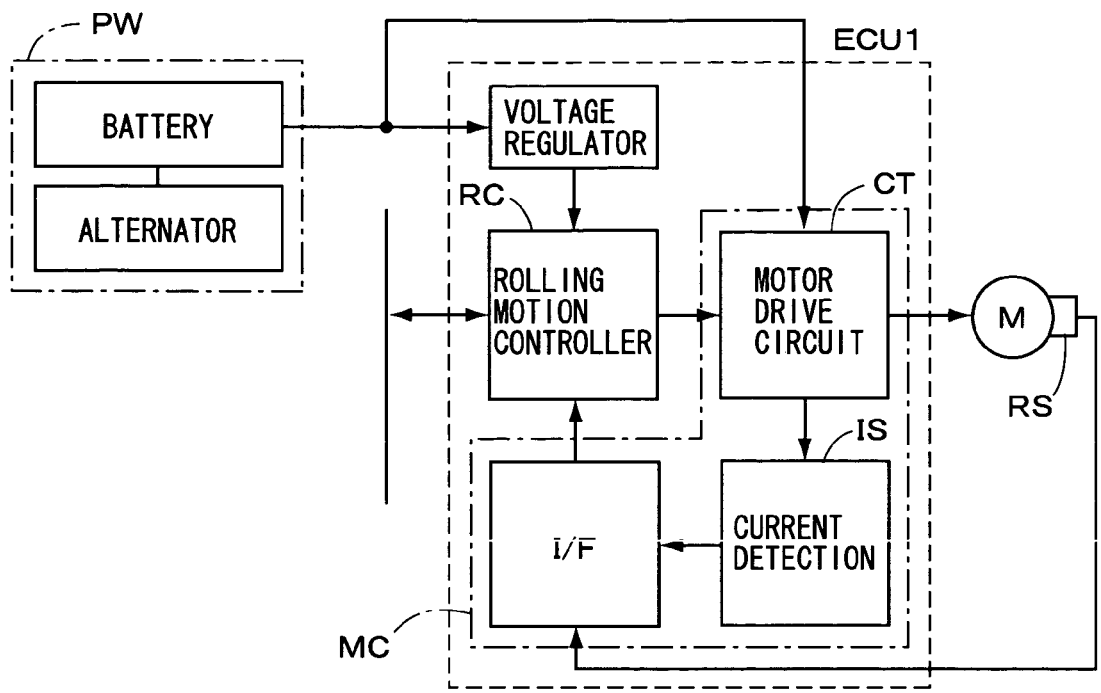
FIG. 2 is a block diagram of an example of a stabilizer control unit according to an embodiment of the present invention.

In the stabilizer actuator FT, a stabilizer control unit ECU1 which is provided with CPU, ROM and RAM for controlling the electric motor M, as shown in FIG. 2, for example. According to the stabilizer control unit ECU1 of the present embodiment, the voltage applied to the motor M by a motor drive circuit CT is regulated by a rolling motion controller RC. The electric current fed to the motor M from the motor drive circuit CT is detected by a current detection block IS, and fed back to the rolling motion controller RC through an interface I/F, together with the rotational angle signal of the motor M detected by the rotational angle sensor RS. The controller RC and motor drive circuit CT are connected to a power source PW. According to the present embodiment, a three-phase brushless motor is used for the motor M, while the motor M is not limited to it, but may be formed by a motor having other number of phases, even by a brush motor.

Figure 3:
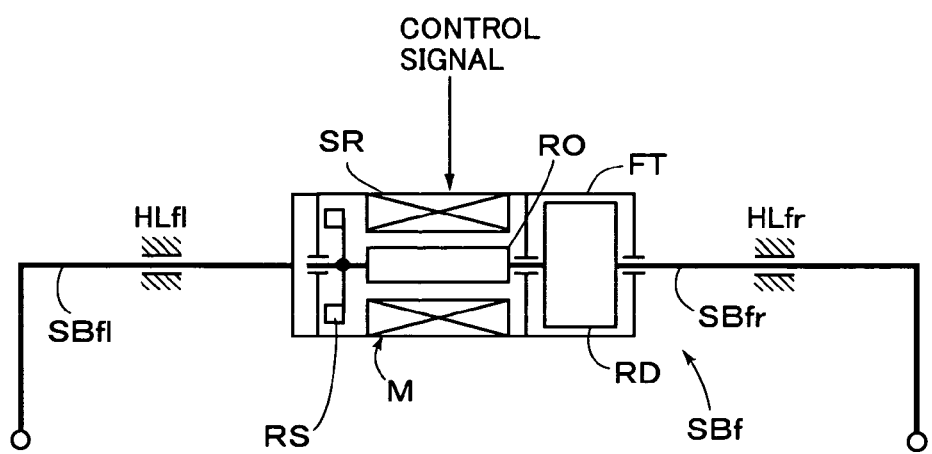
FIG. 3 is a block diagram illustrating a practical example of a stabilizer actuator according to an embodiment of the present invention.

As shown in FIG. 3, the stabilizer actuator FT includes a front stabilizer SBf, which is provided with a pair of (right and left) stabilizer bars SBfr and SBfl, one end of each bar is connected to a right or left wheel (not shown), and the other end of one bar is connected to a rotor RO of the electric motor M through a speed reducing mechanism (or, speed reducer) RD, and the other end of the other one bar is connected to a stator SR of the motor M. The stabilizer bars SBfr and SBfl are mounted on a vehicle body (not shown) by holding members HLfr and HLfl. When the motor M is energized, torsion force is created on each of the divided stabilizer bars SBfr and SBfl, so that apparent torsion spring property of the front stabilizer SBf is changed to control the roll rigidity of the vehicle body. A rotational angle sensor RS is disposed in the stabilizer actuator FT, to act as a rotational angle detection device for detecting a rotational angle of the motor M. The stabilizer actuator RT is constituted in the same manner as described above, and it includes the same motor as the motor M for use in the stabilizer actuator FT.

Next, referring to FIG. 4, will be explained the active roll restraining control, wherein the information including the steering angle (handle angle) ($\delta f$) is detected by a vehicle driver operation detection device M11 including the steering angle sensor SA (in FIG. 1), and wherein vehicle motion variable including the vehicle speed, lateral acceleration and yaw rate is detected by a vehicle running condition detection device M12. Based on these information, a desired value (Rmv) of vehicle active roll moment is calculated at a block M13 to achieve a desirable rolling performance of the vehicle. At a vehicle behavior determination block M14, a vehicle steering performance (oversteer or understeer) is determined on the basis of the steering operation of the vehicle driver and the vehicle motion variable. Next, the desired value of the front and rear roll rigidity ratio is calculated at a block M15 on the basis of the calculated steering performance and vehicle motion variable. Based on the desired values of active roll moment and roll rigidity ratio of the vehicle, the desired values of active roll moment for the front and rear wheels are calculated at a block M16.

Then, on the basis of these desired values, the desired value of motor current will be converted at a block M17, and the stabilizer actuators FT and RT are controlled by an actuator servo block M18. Furthermore, it is determined, at a motor control allowing or prohibiting determination block M19, whether allowing or prohibiting the control of the motor M is to be made, in response to the controlling condition of the actuator servo block M18, and the electric current is controlled to be fed to the motor M, or not to be fed thereto, in response to a signal for allowing or prohibiting the control of the motor M. Consequently, it is possible to reduce consumption of electric power (or, energy consumption), and reduce heat load to the electronic controller ECU and electric motor M.

With respect to the turning operation of the vehicle to the right and left, the vehicle motion variable indicative of the turning operation and rolling motion is of a positive or negative value which is determined in accordance with the turning direction. Furthermore, a threshold value is provided for the vehicle motion variable of positive or negative value, so that it is complicated to explain the determination of initiating or terminating the control by comparing the variable with the threshold value. Therefore, the vehicle turning operation and rolling motion of the positive value will be used hereinafter.

Figure 4:
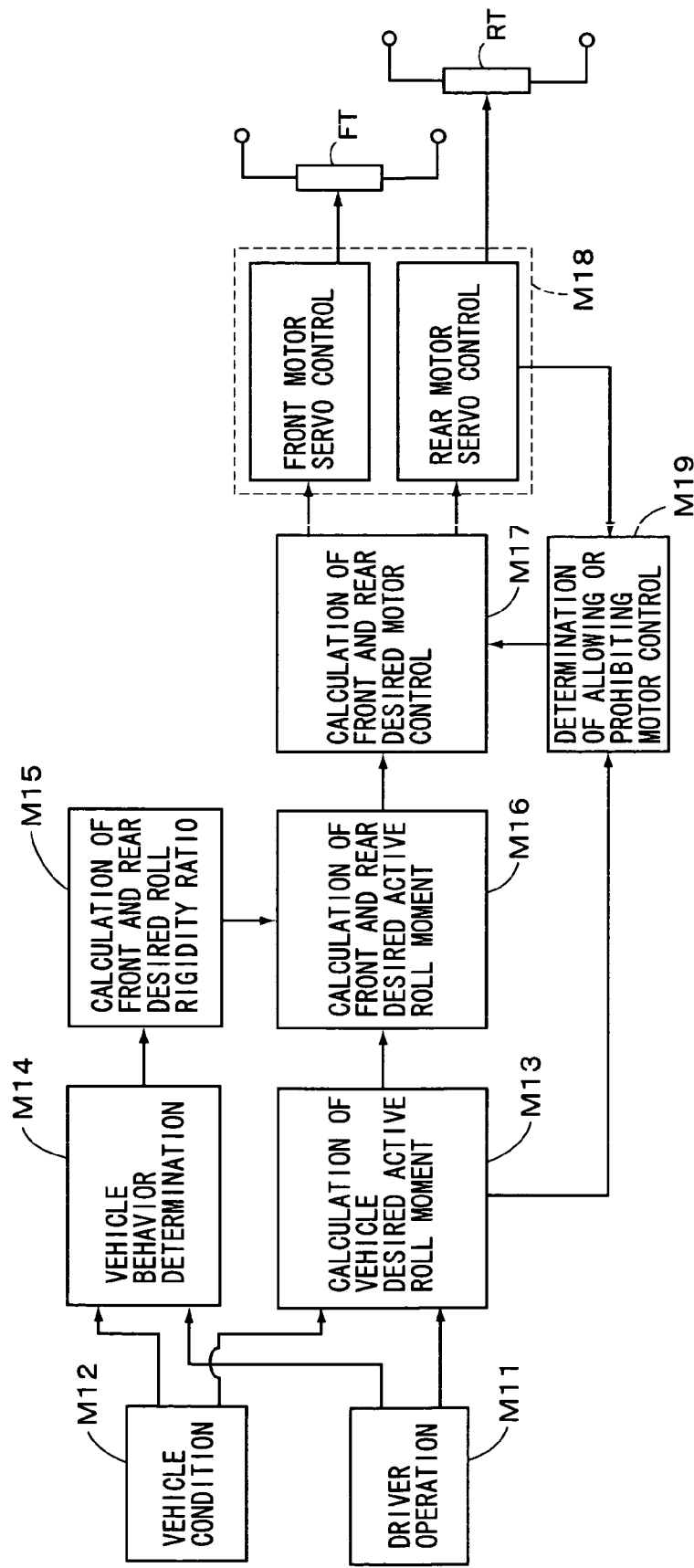
FIG. 4 is a block diagram of an active roll restraining control according to an embodiment of the present invention.
Figure 5:
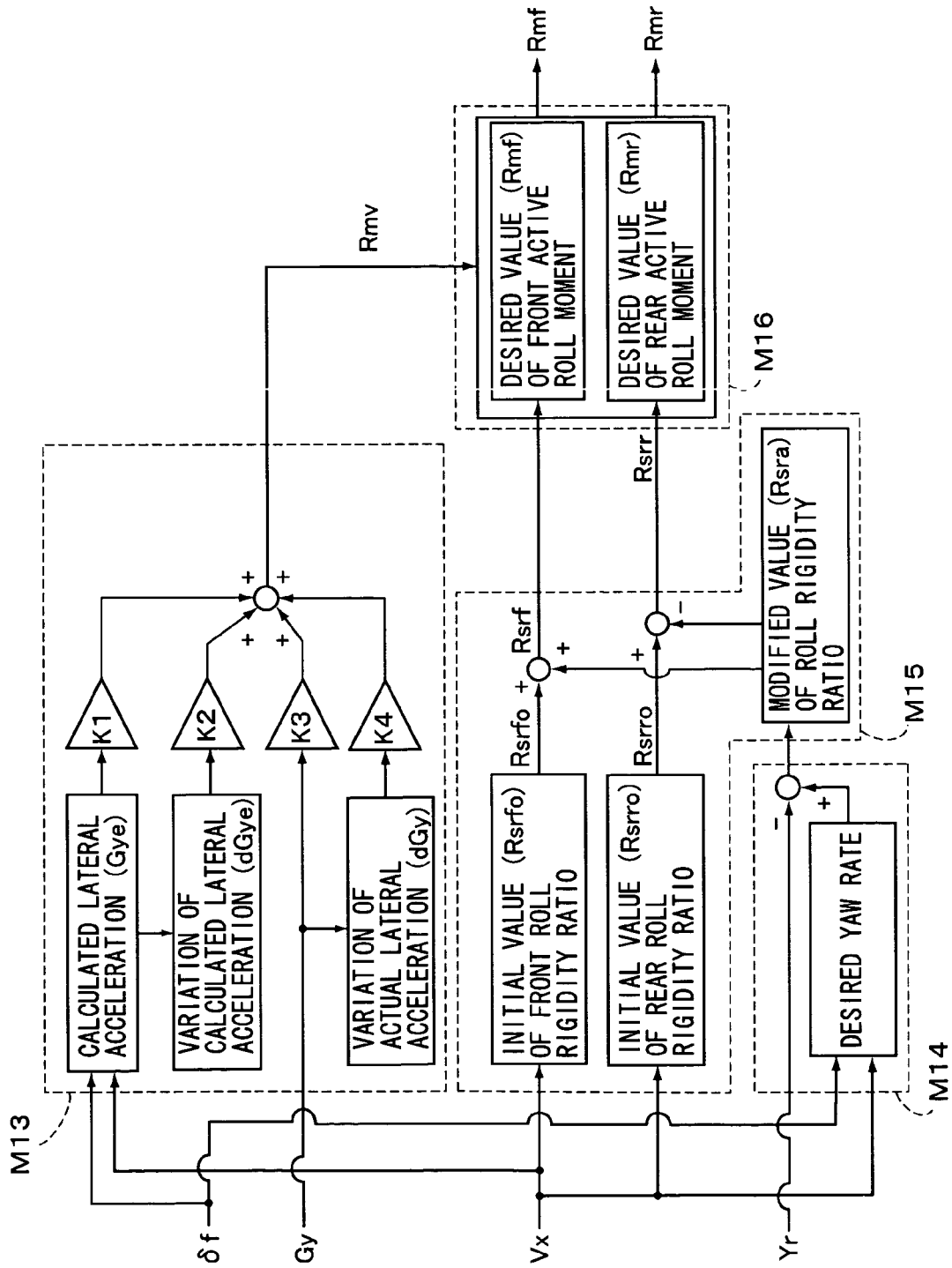
FIG. 5 is a block diagram of an example of the active roll restraining control as shown in FIG. 4.

FIG. 5 shows an example of the embodiment as shown in FIG. 4, wherein a desired value (Rmv) of vehicle active roll moment for restraining the rolling motion of the vehicle as a whole is calculated at the block M13, on the basis of the lateral acceleration (Gy) detected by the lateral acceleration sensor YG, variation of actual lateral acceleration (dGy) obtained by differentiating the lateral acceleration (Gy), calculated (or, estimated) lateral acceleration (Gye) calculated by the steering angle (handle angle) ($\delta f$) and vehicle speed (Vx), and variation of the calculated lateral acceleration (dGye) obtained by differentiating the calculated lateral acceleration (Gye). The calculated lateral acceleration (Gye) can be obtained by the following equation (1):

$$Gye=(Vx^2 \cdot \delta f)/\{L \cdot N \cdot (1+Kh \cdot Vx^2)\} \quad (1)$$

where "L" is a wheel base, "N" is a steering gear ratio, and "Kh" is a stability factor.

Consequently, the desired value (Rmv) of active roll moment to be applied to the vehicle as a whole to achieve an appropriate rolling performance can be obtained by the following equation (2):

$$Rmv=K1 \cdot Gye+K2 \cdot dGye+K3 \cdot Gy+K4 \cdot dGy \quad (2)$$

where K1-K4 are control gains.

As described above, the calculated lateral acceleration (Gye) calculated by the steering angle ($\delta f$) and vehicle speed (Vx) and its variation (dGye) are taken into consideration, so as to compensate a delay in calculation or the responsibility of the actuator.

Figure 6:
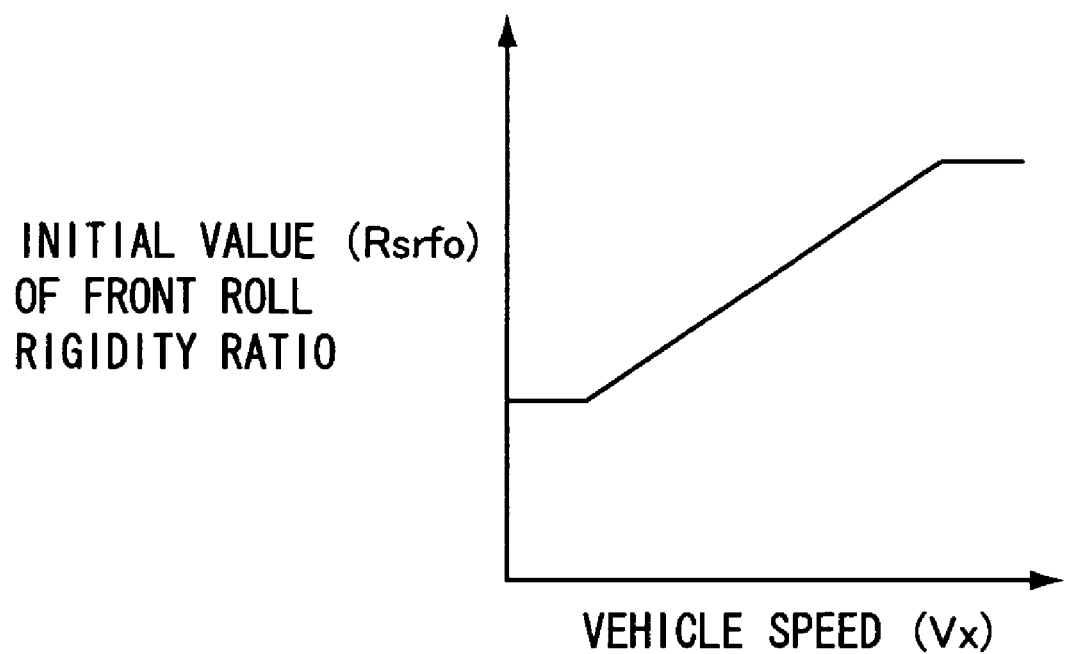
FIG. 6 is a diagram showing an example of a map for setting an initial value of a front wheel roll rigidity ratio according to an embodiment of the present invention.

The desired value of the front and rear roll rigidity ratio is calculated at the block M15 as follows. At the outset, the initial values (Rsrfo) and (Rsrro) are set for the front roll rigidity ratio and rear roll rigidity ratio, respectively, on the basis of the vehicle speed (Vx). As shown in FIG. 6, the initial value (Rsrfo) for the front roll rigidity ratio is set to be relatively low when the vehicle is running at relatively low speed, whereas it is set to be relatively high when the vehicle is running at relatively high speed, to force the vehicle to be likely in the understeer condition when the vehicle is running at relatively high speed. Then, the initial value (Rsrro) for the rear roll rigidity ratio is set to be (1-Rsrfo). Next, a desired yaw rate (Yre) is calculated on the basis of the steering angle ($\delta f$) and vehicle speed (Vx) at the vehicle behavior determination block M14, to determine the vehicle steering performance, and then compared with the actual yaw rate (Yr) to obtain a yaw rate deviation ($\Delta Yr$), on the basis of which a modified value (Rsra) for the roll rigidity ratio is calculated. As a result, when the vehicle is likely to be in the understeer condition, the front roll rigidity ratio is decreased, to modify the rear roll rigidity ratio to be increased. On the contrary, when the vehicle is likely to be in the oversteer condition, the front roll rigidity ratio is increased, to modify the rear roll rigidity ratio to be decreased. Then, the desired value (Rmf) of active roll moment for the front wheel and the desired value (Rmr) of active roll moment for the rear wheel are calculated at the block M16, on the basis of the desired value (Rmv) of vehicle active roll moment, the desired value (Rsrf) of the front roll rigidity ratio, and the desired value (Rsrr) of the rear roll rigidity ratio, in accordance with the equations of [Rmf=Rmv·Rsrf] and [Rmr=Rmv·Rsrr], respectively. And then, the torsion force to be created at each of the front and rear stabilizer actuators FT and RT is determined on the basis of the desired values (Rmf) and (Rmr) of the front and rear roll active roll moments, respectively, to control the motor M, as explained hereinafter.

Figure 7:
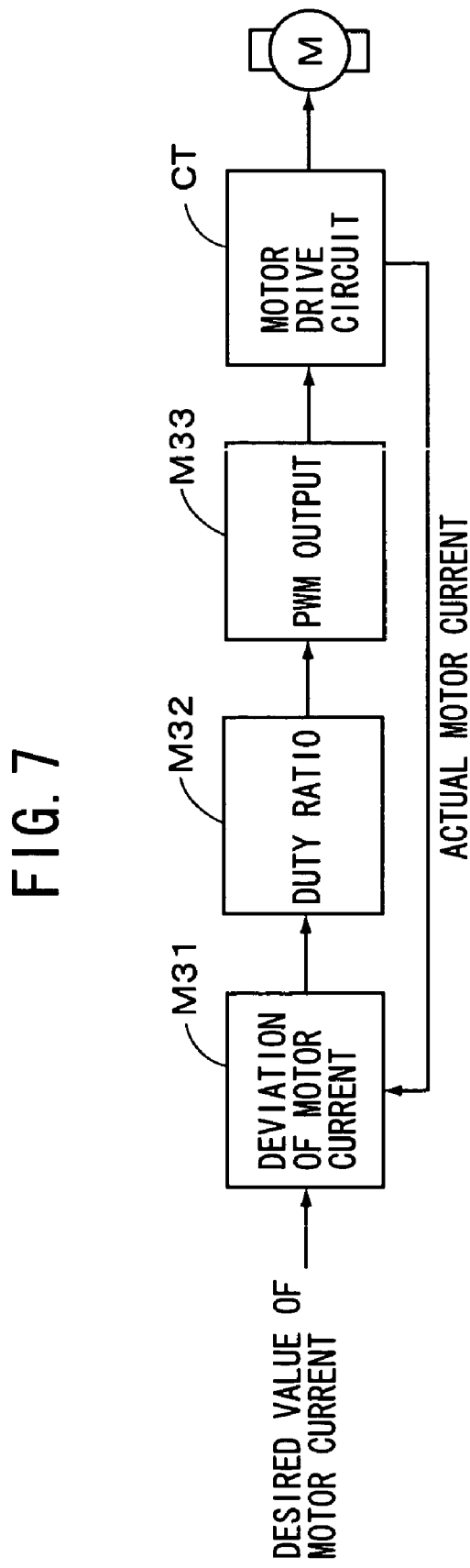
FIG. 7 is a block diagram of an example of a motor control according to an embodiment of the present invention.

At the outset, the control of the motor M on the basis of the desired value of electric current, with reference to FIG. 7 which shows an embodiment of the actuator servo control block M18 as shown in FIG. 4. As the motor current and the output torque are approximately proportional to each other, the desired value (Itf) of electric current fed to the motor M of the front stabilizer actuator FT and the desired value (Itr) of electric current fed to the motor M of the rear stabilizer actuator RT will be provided as [Itf=Km1·Rmf] and [Itr=Km2·Rmr], respectively. "Km1" and "Km2" are coefficients for converting the desired value (Rmf) of active roll moment for the front wheel and the desired value (Rmr) of active roll moment for the rear wheel into the desired value of motor current, respectively, to be provided in advance considering the torsional rigidity, geometrical mounting position, length of a lever, gear ratio of the speed reducing mechanism, or the like. In order to convert the desired value, the conversion can be made according to a map which is provided in advance.

As shown in FIG. 7, therefore, the desired value of electric current fed to the motor M and the actual value of motor current detected by the motor drive circuit CT are compared to provide a deviation of motor current at a block M31. In response to the deviation of motor current, a duty ratio is provided at a block M32 according to a PID control, to calculate a PWM output at a block M33 in response to the duty ratio, and switching elements in the motor drive circuit CT are controlled by the PWM output, to control the motor M. In the case where the turning operation of the vehicle is gradually decreased to be shifted into a motion of the vehicle moving straight, thereby to reduce the rolling motion, the electric current is prohibited from being fed to the motor M, to reduce the energy consumption and heat load.

Figure 8:
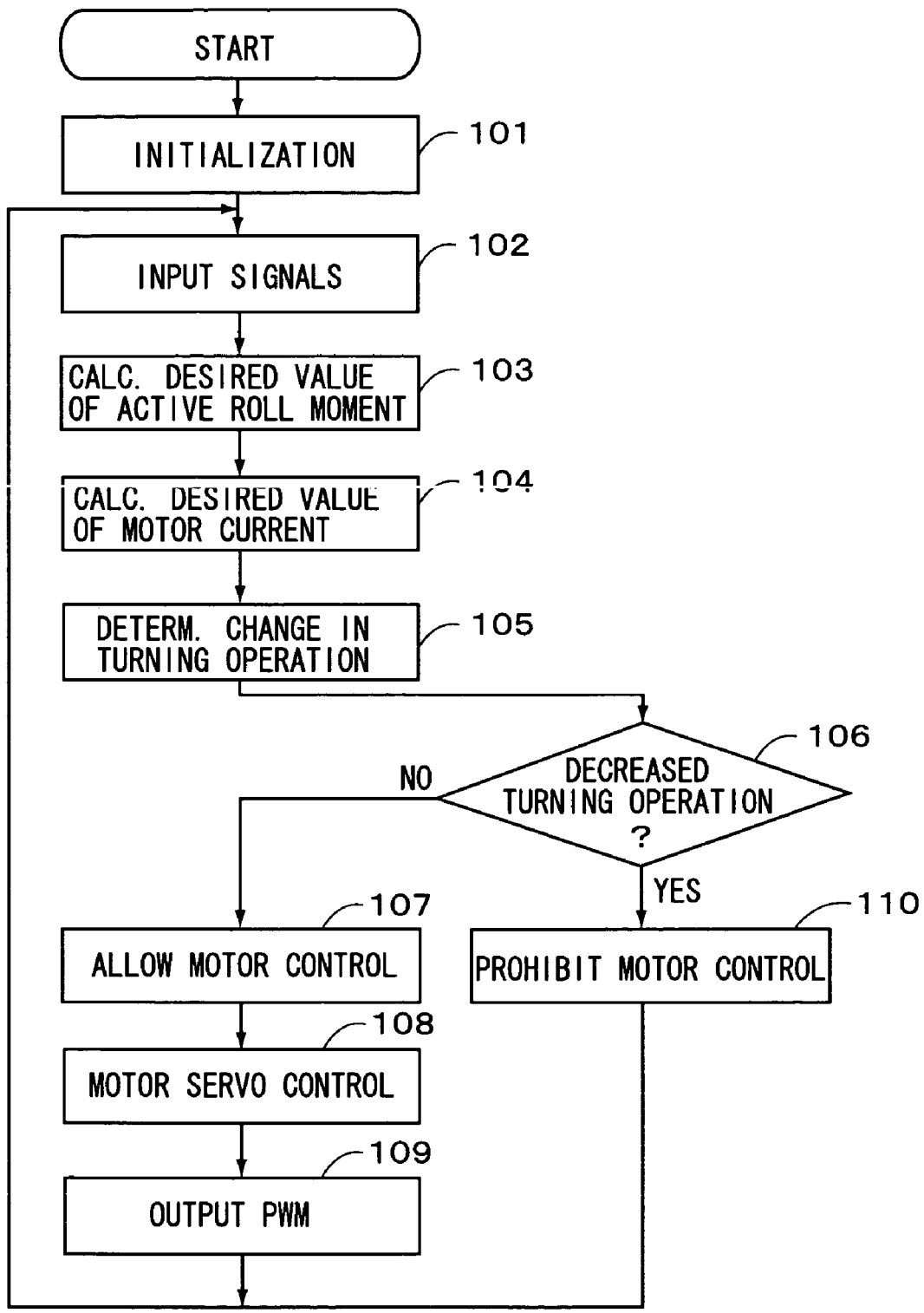
FIG. 8 is a flow chart showing a stabilizer control including a process for prohibiting a motor control when the turning operation is being decreased according to an embodiment of the present invention.

FIG. 8 is a flowchart showing an example for controlling the stabilizer according to the present embodiment, including a process for prohibiting the motor control when the turning operation is being decreased. At the outset, the program provides for initialization of the system at Step 101, and the signal indicative of rotational angle of the motor M detected by the rotational angle sensor RS connected to the stabilizer control unit ECU1 (or a current sensor in the electronic controller ECU) is read at Step 102, and communication signals are read through the communication bus. Then, the program proceeds to Step 103, where the desired values (Rmf) and (Rmr) of active roll moment applied to the vehicle are set on the basis of those signals. On the basis of the desired values (Rmf) and (Rmr) of active roll moment, therefore, the desired value of motor current is calculated at Step 104.

Then, with respect to a change in turning operation of the vehicle, it is determined at Step 105 which one of three conditions including increased turning operation, holding turning operation and decreased turning operation. If it is determined at Step 106 that the turning operation is not being decreased, the program proceeds to Step 107, where [allowing motor control] is set to provide a flag for allowing the motor control, so that a motor servo control is performed at Step 108, and further proceeds to Step 109 where the PWM signal is output to the motor M. On the contrary, if it is determined at Step 106 that the turning operation is being decreased, the program proceeds to Step 110, where [prohibiting motor control] is set to provide a flag for prohibiting the motor control, so that the electric current will not be fed to the motor M. Since the change in rolling motion of the vehicle is resulted from the change in turning operation of the vehicle, a determination of the change in rolling motion of the vehicle may be employed at Step 106, instead of the determination of change in turning operation of the vehicle.

The determination of change in turning operation of the vehicle as described above is made on the basis of the calculated lateral acceleration (Gye) and the variation thereof (variation in time) (dGye) obtained at the block M13 in FIG. 5, in accordance with the following Table 1.

| No. | Gye | dGye | DETERMINATION OF CHANGE IN TURNING OPERATION |
|---|---|---|---|
| 1 | + | + | INCREASE |
| 2 | + | − | DECREASE |
| 3 | + | 0 | HOLD |
| 4 | 0 | + | INCREASE |
| 5 | 0 | − | INCREASE |
| 6 | 0 | 0 | HOLD |
| 7 | − | + | DECREASE |
| 8 | − | − | INCREASE |
| 9 | − | 0 | HOLD |

In the above Table 1, according to a combination of the calculated lateral acceleration (Gye) and the variation of calculated lateral acceleration (dGye), it is determined which is one of the increased turning operation (abbreviated as "increase" in Table 1), decreased turning operation (abbreviated as "decrease") and holding turning operation (abbreviated as "hold") corresponds to the change in turning operation of the vehicle. According to the Table 1, if [−G1<Gye<G1] is fulfilled, the calculated lateral acceleration (Gye) is determined to be zero. If [Gye≧G1] is fulfilled, the calculated lateral acceleration (Gye) is determined to be "+". And, if [Gye≦−G1] is fulfilled, the calculated lateral acceleration (Gye) is determined to be "−". With respect to the variation of calculated lateral acceleration (dGye), if [−G2<dGye<G2] is fulfilled, the variation (dGye) is determined to be zero. If [dGye≧−G2] is fulfilled, the variation (dGye) is determined to be "+". And, if [dGye≦−G2] is fulfilled, the variation (dGye) is determined to be "−". "G1" and "G2" are constants of positive value, and provided in advance.

Although the change in turning operation of the vehicle is determined according to the combination of the calculated lateral acceleration (Gye) and the variation of calculated lateral acceleration (dGye) in the Table 1 as described above, it may be determined on the basis of the steering angle, variation thereof, actual lateral acceleration, variation thereof, yaw rate and variation thereof. Or, it may be determined according to the combination of those results. The change in turning operation of the vehicle can be made by monitoring the desired value (Rmv) of vehicle active roll moment. In this case, the turning operation can be determined to be as "increase", if the desired value (Rmv) is increased comparing with the value set in the previous cycle. It can be determined to be as "hold", if the desired value (Rmv) is equal to the value set in the previous cycle, and it can be determined to be as "decrease", if the desired value (Rmv) is decreased comparing with the value set in the previous cycle.

Figure 9:
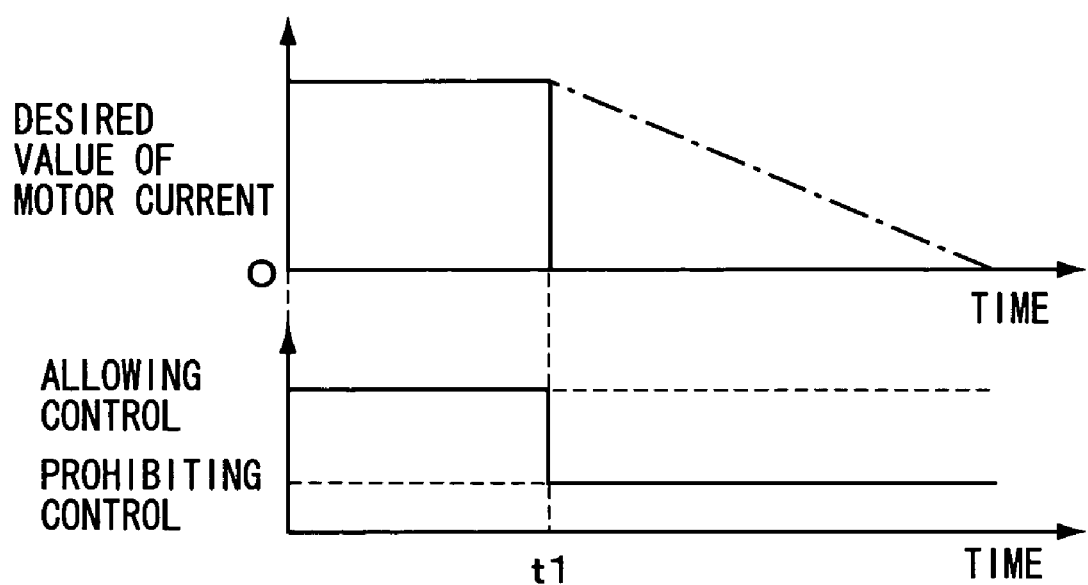
FIG. 9 is a time chart showing an example of operation of the control performed as shown in FIG. 8.

Thus, the electric current is prohibited from being fed to the motor M when the turning operation is being decreased, so that the desired value of motor current calculated on the basis of the desired values (Rmf and Rmr) of active roll moment will be of a property indicated by a one-dot chain line in FIG. 9 (hereinafter, will be explained without identifying the front or rear stabilizer). If it is determined at the time (t1) in FIG. 9 that the turning operation is being decreased, the flag for allowing the control is changed into the flag for prohibiting the control, so that the control of the motor M is set as the condition for being prohibited, i.e., the condition where the electric current is not fed to the motor M. Therefore, in the "decrease" operation, i.e., in the state that the turning operation is shifted into the motion of the vehicle moving straight, inertia force (lateral acceleration) is gradually decreased, and a relative torsion displacement of the stabilizer produced by the output of the motor M is gradually decreased. Then, the roll moment produced in the stabilizer control apparatus is being gradually reduced to zero. Thus, in the case where the turning operation of the vehicle is being decreased, the electric current is not fed to the motor M, so that the energy consumption can be reduced, and heat can be prevented from being generated in the motor M and electronic controller ECU.

In the case where the turning operation is shifted into the motion of the vehicle moving straight, to be in the decreased turning operation, so that the rolling motion is decreased to gradually reduce the roll moment to be zero, it is desirable to coincide with the case where the relative angular displacement of the stabilizer bars as described before is decreased in response to the "decrease" operation. When the electric current is not fed to the motor M, however, change in the relative angular displacement of the pair of stabilizer bars is not be made constant, due to holding force or inertia force of the motor M affected by cogging torque of the motor M, reverse efficiency of the speed reducing mechanism RD, friction or the like. As a result, the decreased turning operation does not coincide with the decreased roll motion, so that an unusual feeling might be given to a vehicle driver. In order to solve this problem, another embodiment will be explained hereinafter, with reference to FIG. 10, wherein Steps 201-205 are processed in the same manner as Steps 101-105 as explained before.

Figure 10:
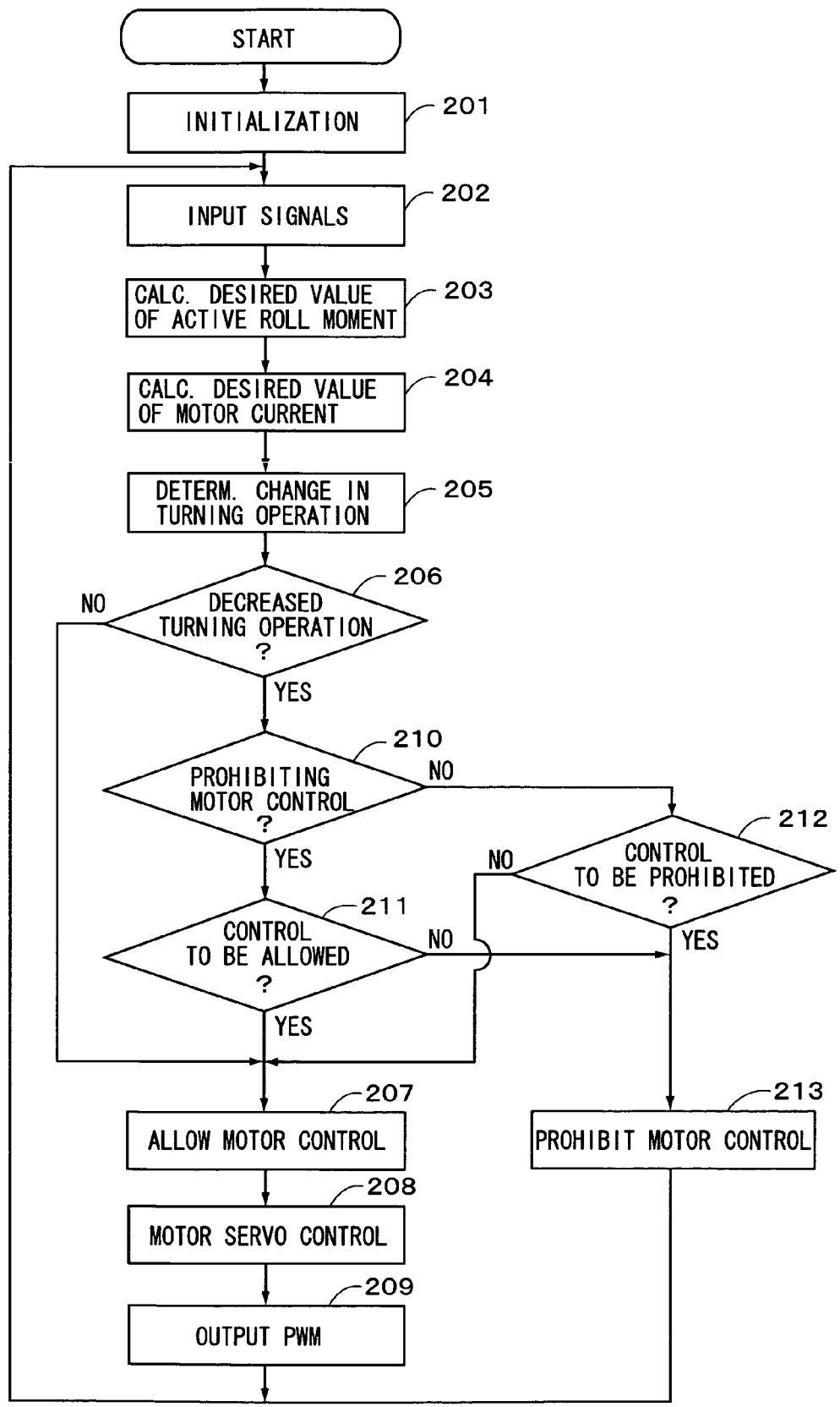
FIG. 10 is a flow chart showing a control for allowing or prohibiting a motor control on the basis of a relative angular displacement of stabilizer bars according to another embodiment of the present invention.

In FIG. 10, if it is determined at Step 206 that the turning operation is not being decreased, the program proceeds to Step 207, where the motor control is allowed (allowing motor control) to achieve a motor servo control at Step 208, and further proceeds to Step 209, where the PWM output is fed to the motor M. On the contrary, if it is determined at Step 206 that the turning operation is being decreased, the motor servo control is not terminated immediately, but the program proceeds to Step 210, where it is determined whether the motor control is being prohibited. If the result is affirmative, the program proceeds to Step 211, where it is determined whether the motor control is to be allowed. The determination of initiating [allowing motor control] is made on the basis of a deviation ($\phi t - \phi a$) between the relative angular displacement (desired angular displacement $\phi t$) of the stabilizer bars corresponding to the desired value (Rmf and Rmr) of active roll moment and the actual relative angular displacement ($\phi a$) of the stabilizer bars. Furthermore, it can be determined whether the deviation is increasing or decreasing, by means of variation (in time) of the deviation $\{d(\phi t - \phi a)\}$. If the condition of $[\{Ka1\cdot(\phi t - \phi a) + Ka2\cdot d(\phi t - \phi a)\} \geq Ka3]$ is fulfilled at Step 211, for example, the motor control is to be allowed, so that [allowing motor control] is set, wherein "Ka1" and "Ka2" are weighting factors (including zero) for the deviation and variation thereof, respectively, and "Ka3" is a predetermined value for determining the threshold value.

If it is determined at Step 210 that the motor control is not being prohibited, the program proceeds to Step 212, where it is determined that the motor control is to be prohibited. If the turning operation is decreased, so that the rolling motion is decreased to coincide with the relative angular displacement of the stabilizer bars, supply of the electric current fed to the motor M can be terminated. At Step 212, the determination is made on the basis of the deviation ($\phi t - \phi a$) and the variation thereof $\{d(\phi t - \phi a)\}$, in the same manner as the determination of initiating [allowing motor control]. That is, if the condition of $[\{Ka4\cdot(\phi t - \phi a) + Ka5\cdot d(\phi t - \phi a)\} < Ka6]$ is fulfilled, it is determined that the decreased turning operation has come to approximately coincide with the relative angular displacement of the stabilizer bars, so that the operation is shifted into such a condition that the supply of the electric current fed to the motor M is prohibited. "Ka4" and "Ka5" are weighting factors (including zero) for the deviation and variation thereof, respectively, and "Ka6" is a predetermined value for determining the threshold value. If it is determined at Step 212 that the motor control is to be prohibited, the program proceeds to Step 213, where the motor control is prohibited, so that the electric current is not fed to the motor M.

The deviation between the desired value and actual value of the relative angular displacement of the stabilizer bars is produced with respect to each of the front and rear stabilizers, while the change of [allowing motor control] or [prohibiting motor control] is made separately and independently of the front and rear stabilizers. Or, the motor control for either one of the front and rear stabilizers may be given to priority, and the motor control for the other one of them may be dependent of the former. For example, in the case where the change of [allowing motor control] or [prohibiting motor control] for the front stabilizer is given to priority, the determination of [allowing motor control] or [prohibiting motor control] for the rear stabilizer (to be made on the basis of the deviation between the desired value and actual value of the relative angular displacement of the stabilizer bars) will not be made, whereas the change of [allowing motor control] or [prohibiting motor control] for the rear stabilizer shall be made on the basis of the result of determination with respect to the front stabilizer.

Figure 11:
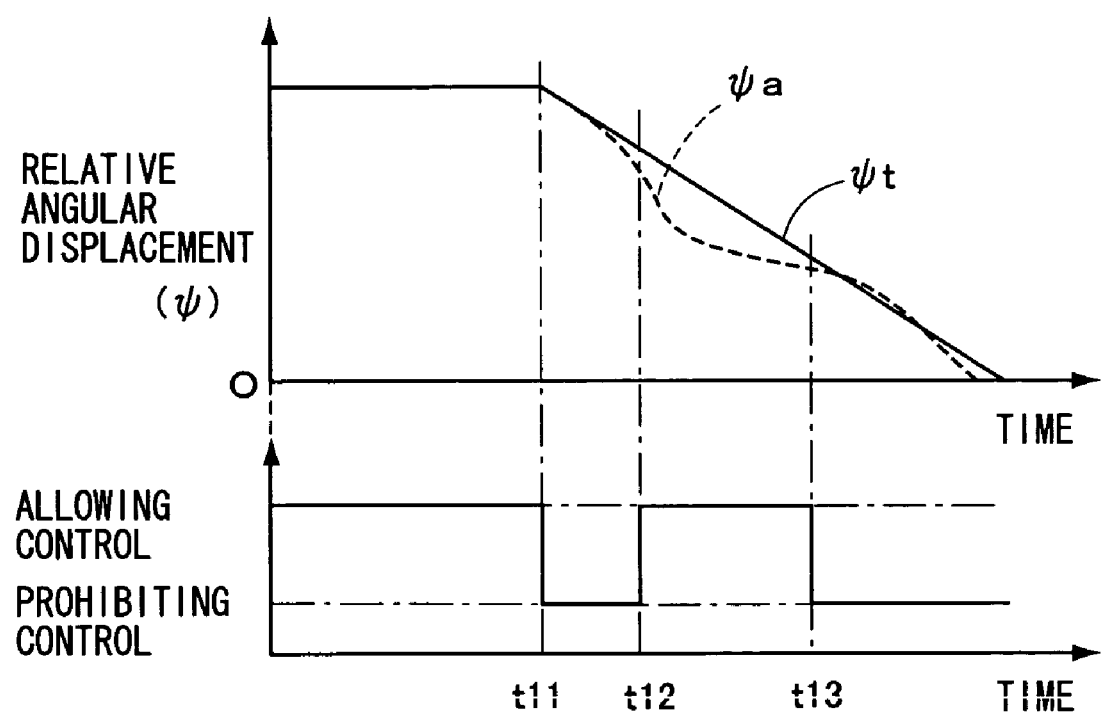
FIG. 11 is a time chart showing an example of operation of the control performed as shown in FIG. 10.

FIG. 11 shows a time chart of the desired value ($\phi t$) and actual value ($\phi a$) of the relative angular displacement of the stabilizer bars, and conditions of [allowing motor control] and [prohibiting motor control], according to an example of the control as shown in FIG. 10. If it is determined at the time (t11) in FIG. 11 that the turning operation is being decreased, the motor control is shifted from [allowing motor control] to [prohibiting motor control], the supply of the electric current fed to the motor M is terminated. Then, the deviation between the desired value ($\phi t$) and actual value ($\phi a$) is increased, so that if the condition of $[\{Ka1\cdot(\phi t - \phi a) + Ka2\cdot d(\phi t - \phi a)\} \geq Ka3]$ is fulfilled at the time (t12), the motor control is changed to [allowing motor control] to feed the electric current to the motor M again. As a result, the deviation between the desired value ($\phi t$) and actual value ($\phi a$) is decreased, so that if the condition of $[\{Ka4\cdot(\phi t - \phi a) + Ka5\cdot d(\phi t - \phi a)\} < Ka6]$ is fulfilled, the motor control is changed at the time (t13) to [prohibiting motor control] again. Thus, by monitoring the deviation between the desired value ($\phi t$) and actual value ($\phi a$) of the relative angular displacement of the stabilizer bars, and changing [allowing motor control] or [prohibiting motor control], the energy consumption can be reduced, with controllability of the stabilizer control apparatus being maintained.

According to the above-described embodiment, the motor M for actuating the stabilizer actuator FT or RT is controlled on the basis of the desired value of electric current provided on the basis of the desired value (Rmf and Rmr) of active roll moment. Considering the torsional rigidity of the stabilizer bar, suspension geometry or the like, there exist a predetermined relationship between the active roll moment and the relative angular displacement of the stabilizer bars. Therefore, the motor M may be controlled on the basis of the desired value of the relative angular displacement of the stabilizer bars provided in response to the desired value (Rmf and Rmr) of active roll moment, instead of the desired value of electric current. In this case, the desired value ($\phi tf$)

and desired value (φtr) of relative angular displacement of the stabilizer bars are set as [φtf=Km3·Rmf] and [φtr=Km4·Rmr], respectively. "Km3" and "Km4" are coefficients for converting the desired value (Rmf) of active roll moment for the front wheel and the desired value (Rmr) of active roll moment for the rear wheel into the desired value of relative angular displacement of the stabilizer bars, respectively, to be provided in advance considering the torsional rigidity, geometrical mounting position, length of a lever, gear ratio of the speed reducing mechanism, or the like. Or, in order to convert the desired value, the conversion can be made according to a map which is provided in advance.

The servo control of the motor M based on the relative angular displacement of the stabilizer bars as described above can be made as shown in FIG. 12. At the outset, the desired value (φtf) and desired value (φtr) of relative angular displacement of the front and rear stabilizer bars are compared with the actual value (φaf) and actual value (φar) of relative angular displacement of the front and rear stabilizer bars, respectively, to provide the deviation at a block M41. The actual value of relative angular displacement can be detected directly by a rotational senor (not shown) mounted on the stabilizer bar, or can be obtained on the basis of the rotational angle signal of the motor M. In response to the deviation of relative angular displacement, a duty ratio is provided at a block M42 according to a PID control, to calculate a PWM output at a block M43 in response to the duty ratio, and switching elements in the motor drive circuit CT are controlled by the PWM output, to control the motor M.

Figure 13:
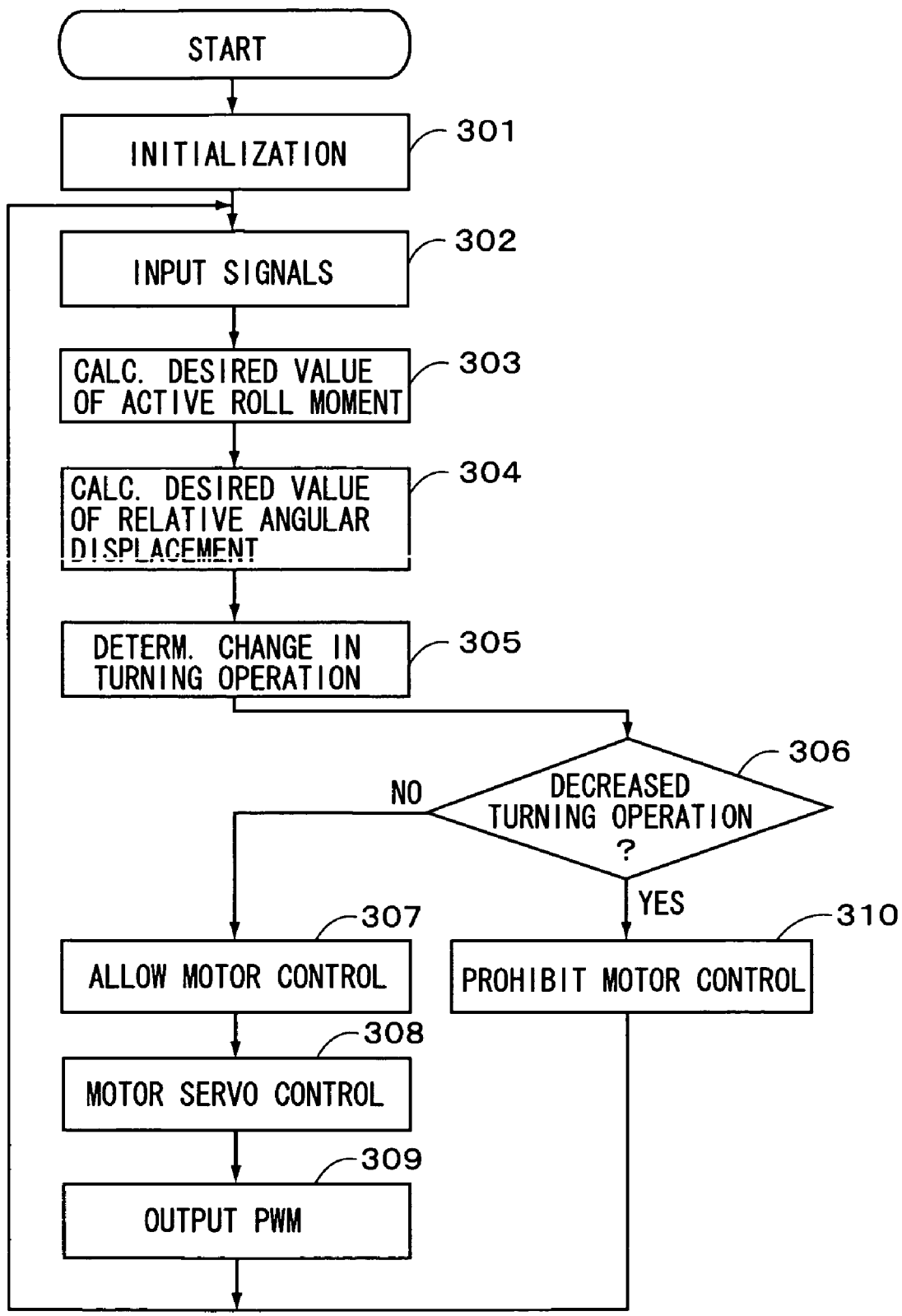
FIG. 13 is a flow chart showing a stabilizer control performed by a motor control on the basis of a relative angular deviation of stabilizer bars according to a further embodiment of the present invention.

FIG. 13 is a time chart showing an example wherein the control of the motor M is performed on the basis of the deviation of relative angular displacement of the stabilizer bars as described above, and prohibited when it is determined that the turning operation is being decreased. As the control performed in FIG. 13 is basically the same as the control performed on the basis of the desired value of motor current as shown in FIG. 8, the detailed explanation will be omitted, with the Steps designated by corresponding two-digits numerals with different hundred numerals from the numerals designating Steps in FIG. 8. Thus, the change in turning operation of the vehicle is determined on the basis of the calculated lateral acceleration (Gye) and the variation of calculated lateral acceleration (dGye) as described before, or on the basis of the variation of desired value (Rmv) of vehicle active roll moment. Then, if it is determined that the turning operation is being decreased, the supply of electric current fed to the motor M is prohibited, whereby the energy consumption and heat load can be reduced.

Figure 14:
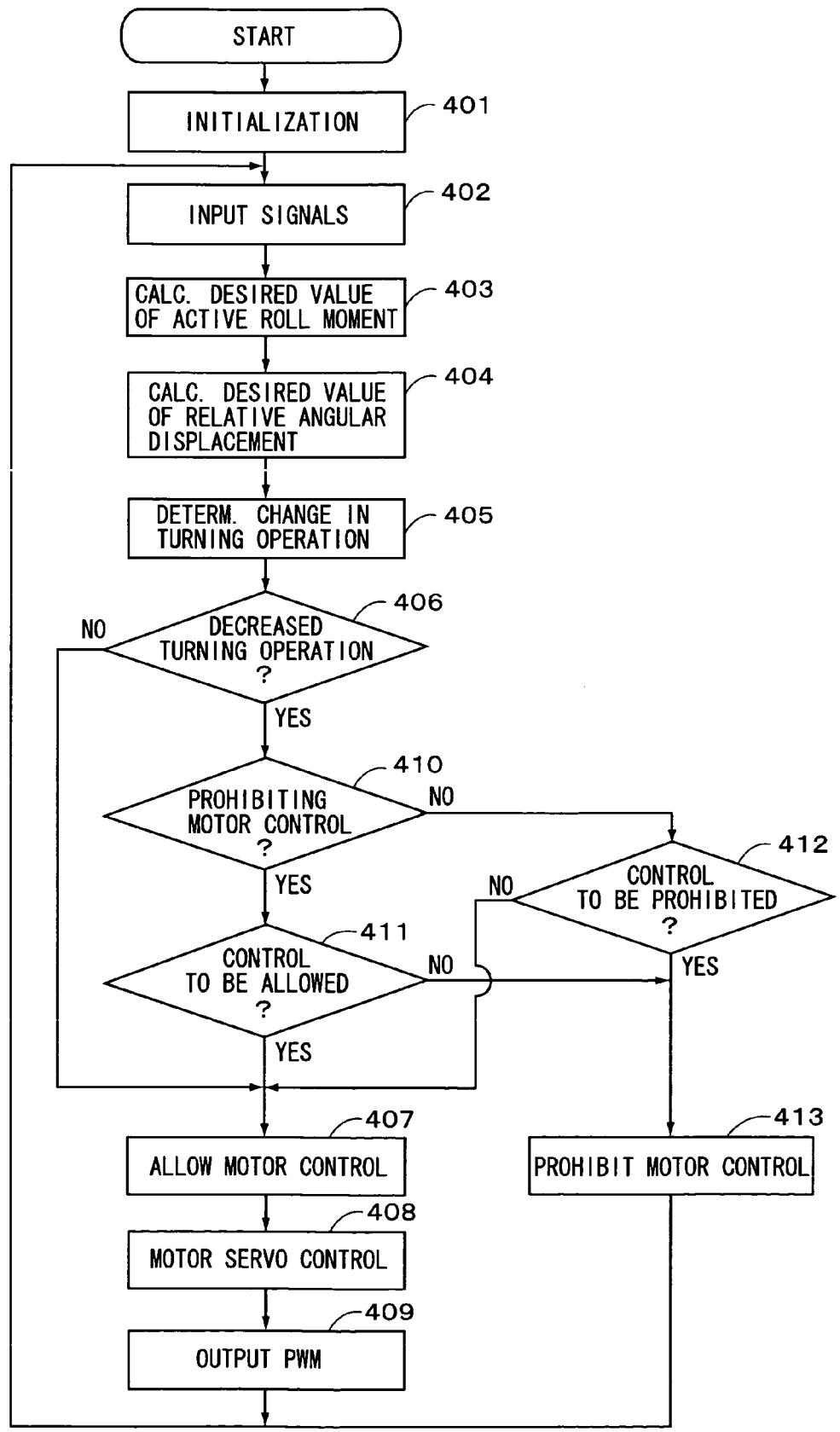
FIG. 14 is a flow chart showing a stabilizer control performed by a motor control on the basis of a relative angular deviation of stabilizer bars according to yet further embodiment of the present invention.

Referring next to FIG. 14, will be explained an embodiment wherein the control of the motor M is performed on the basis of the deviation of relative angular displacement of the stabilizer bars as described above, and basically prohibited when it is determined that the turning operation is being decreased, and wherein [allowing motor control] or [prohibiting motor control] is selected on the basis the deviation between the desired value and the actual value of relative angular displacement of the stabilizer bars, and the variation of the deviation. As the control performed in FIG. 14 is basically the same as the control performed in FIG. 10, the detailed explanation will be omitted, with the Steps designated by corresponding two-digits numerals with different hundred numerals from the numerals designating Steps in FIG. 10. Thus, if it is determined that the turning operation is being decreased, by monitoring the deviation between the desired value and the actual value of relative angular displacement of the stabilizer bars, and changing [allowing motor control] or [prohibiting motor control] properly, the energy consumption and heat load can be reduced, with the controllability of the stabilizer control apparatus being maintained.

Figure 15:
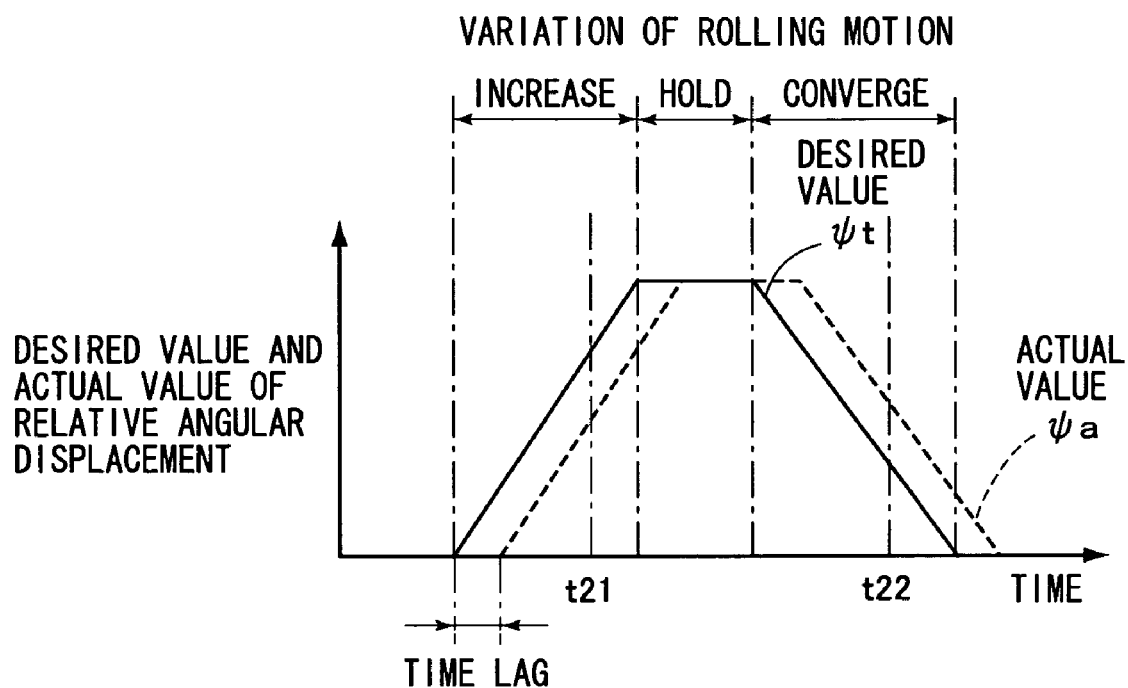
FIG. 15 is a time chart showing an example of operation of the control performed as shown in FIG. 14.

Although the change of [allowing motor control] or [prohibiting motor control] is made on the basis of the change in turning operation of the vehicle according to the embodiments as described above, it can be made without determining the change in turning operation. As shown in FIG. 15, there is caused a time lag between the desired value and the actual value of relative angular displacement of the stabilizer bars. Therefore, when the rolling motion is increased (e.g., at the time "t21"), the desired value (φt) will be greater than the actual value (φa) (i.e., φt>φa), whereas, when the rolling motion is decreased (e.g., at the time "t22"), the desired value (φt) will be smaller than the actual value (φa) (i.e., φt<φa). Based on that relationship, a further embodiment wherein the change of [allowing motor control] or [prohibiting motor control] is made on the basis of the relationship in gratitude between the desired value (φt) and the actual value (φa) of relative angular displacement of the stabilizer bars, is described hereinafter, with reference to FIG. 16.

Figure 16:
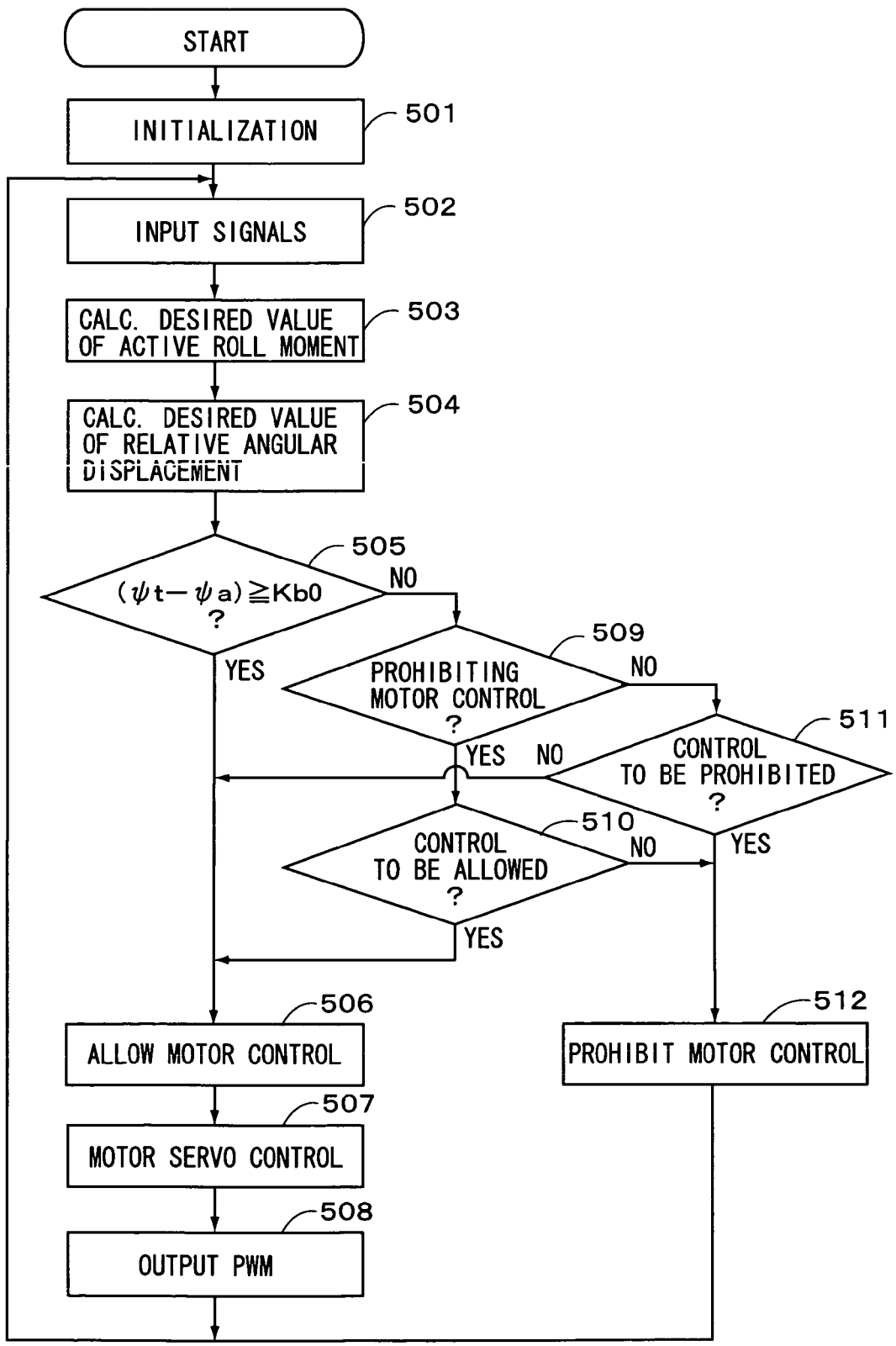
FIG. 16 is a flow chart showing a control for allowing or prohibiting a motor control on the basis of a relative angular deviation of stabilizer bars according to yet further embodiment of the present invention.

In FIG. 16, the program provides for initialization of the system at Step 501, and the signals including the actual value (φa) of relative angular displacement of the stabilizer bars, which includes both of the actual value (φaf) for the front stabilizer and the actual value (φar) for the rear stabilizer, and communication signals are read at Step 502. On the basis of those signals, the desired values (Rmf) and (Rmr) of active roll moment are calculated at Step 503. Then, the desired value (φt) of relative angular displacement of the stabilizer bars, which includes both of the desired value (φtf) for the front stabilizer and the desired value (φtr) for the rear stabilizer, is obtained at Step 504, on the basis of the desired values (Rmf) and (Rmr) of active roll moment, as described before. Next, the desired value (φt) of relative angular displacement of the stabilizer bars is compared with the actual value (φa) at Step 505, so that if the condition of [(φt−φa)≧Kb0] is fulfilled ("Kb0" is a predetermined value for determining the threshold value), the program proceeds to Step 506 where the motor control is allowed. On the contrary, unless the condition of [(φt−φa)≧Kb0] is fulfilled, i.e., if the condition of [(φt−φa)<Kb0] is fulfilled, the program proceeds to Step 509 where it is determined whether the motor control is being prohibited. If it is determined at Step 509 that the motor control is being prohibited, the program proceeds to Step 510 where it is determined whether the motor control is to be allowed, on the basis of the deviation (φt−φa) between the desired value and the actual value of relative angular displacement of the stabilizer bars. Furthermore, in order to determine whether the deviation is increasing or decreasing, the variation of deviation {d(φt−φa)} may be used. For example, if the condition of [{Kb1·(φt−φa)+Kb2·d(φt−φa)}≧Kb3] is fulfilled, the motor control may be shifted to [allowing motor control], wherein "Kb1" and "Kb2" are weighting factors (including zero) for the deviation and variation thereof, respectively, and "Kb3" is a predetermined value for determining the threshold value.

Figure 12:
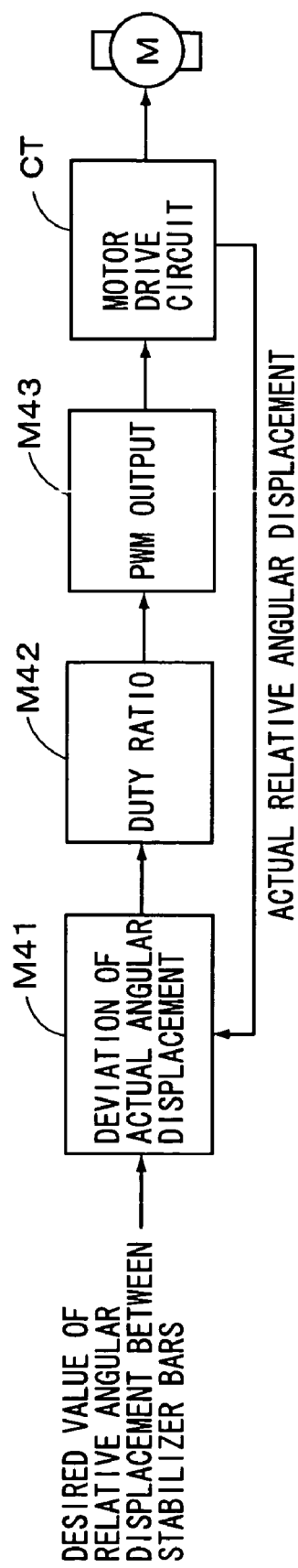
FIG. 12 is a block diagram of a motor control performed on the basis of a relative angular displacement of stabilizer bars according to a further embodiment of the present invention.

If it is determined at Step 509 that the motor control is not being prohibited, the program proceeds to Step 511, where it is determined whether the motor control is to be prohibited, on the basis of the deviation (φt−φa) between the desired value and the actual value of relative angular displacement of the stabilizer bars, as done at Step 510. That is, if the condition of [{Kb4·(φt−φa)+Kb5·d(φt−φa)}<Kb6] is fulfilled, the motor control is shifted to [prohibiting motor control], wherein "Kb4" and "Kb5" are weighting factors (including zero) for the deviation and variation thereof, respectively, and "Kb6" is a predetermined value for determining the threshold value. Then, if it is determined at Step 511 that the motor control is to be prohibited, the program proceeds to Step 512 where the motor control is shifted to [prohibiting motor control], so that the electric current is not fed to the motor M. If it is determined at Step 506 that the motor control is to be allowed, the program proceeds to Step 507 where the motor servo control is performed on the relative angular displacement of the stabilizer bars as shown in FIG. 12, and further proceeds to Step 508 where the PWM output is fed to the motor M.

Figure 17:
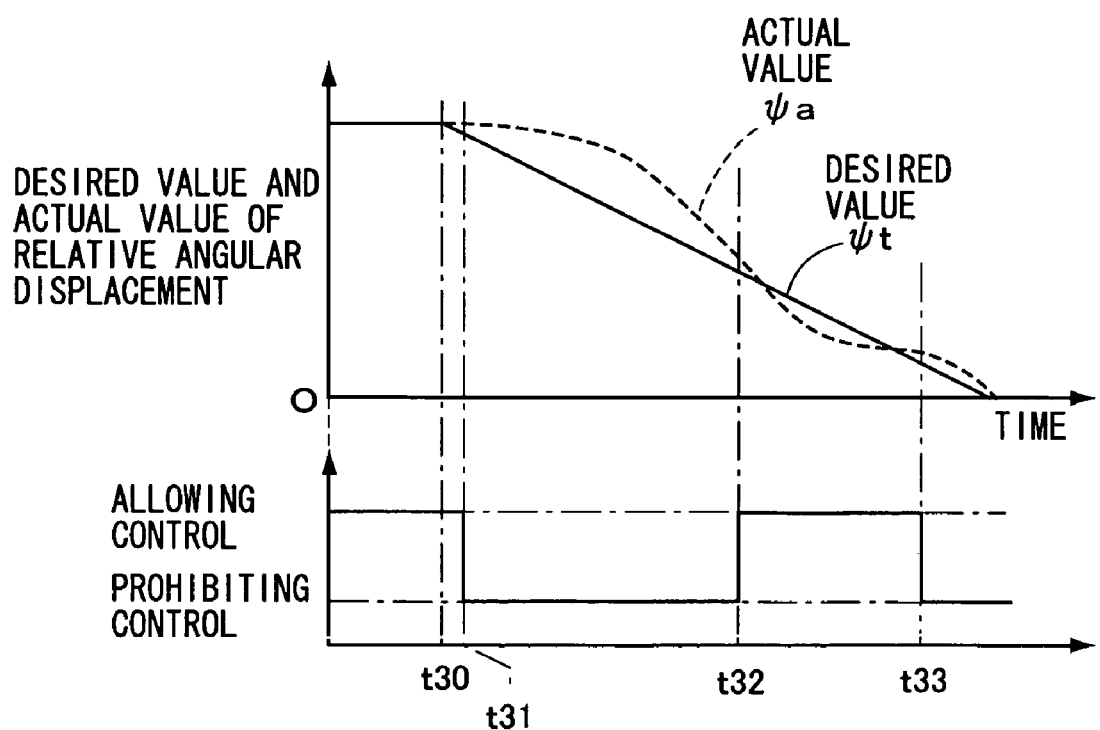
FIG. 17 is a time chart showing an example of operation of the control performed as shown in FIG. 16.

FIG. 17 shows a time chart of an example performed by the embodiment as shown in FIG. 16, wherein the desired value of the relative angular displacement of the stabilizer bars begins to be decreased at the time (t30), so that the turning operation is decreased. The motor control has been in the condition of [allowing motor control] until the time (t30), because the condition of [(φt−φa)≧Kb0] has been fulfilled. In the case where the actual value (φa) has not been decreased, while the desired value (φt) has been decreased, [(φt−φa)<Kb0] is fulfilled. Furthermore, if the condition of [{Kb4·(φt−φa)+Kb5·d(φt−φa)}<Kb6] is fulfilled at the time (t31), the motor control is changed to [prohibiting motor control]. As a result of [prohibiting motor control], the supply of the electric current is not fed to the motor M, so that the force for holding the stabilizer bars is reduced, thereby to decrease the actual value (φa) of relative angular displacement of the stabilizer bars. Consequently, if the condition of [(φt−φa)≧Kb0] or [{Kb1·(φt−φa)+Kb2·d(φt−φa)}≧Kb3] is fulfilled at the time (t32), the motor control is changed from [prohibiting motor control] to [allowing motor control]. Thereafter, the cycle of [allowing motor control] and [prohibiting motor control] as described above will be repeated.

As described above, the control for switching the motor M is not dependent on the determination of change in turning operation of the vehicle, and it will be initiated, if the condition having the threshold value to be compared is fulfilled. Therefore, it can be achieved without any delay in time caused by determining the change in turning operation of the vehicle (variation of rolling motion), and it can follow a small steering operation to be increased or reversed.

Next will be explained a further embodiment of the control of the motor M without the determination of change in turning operation of the vehicle being required, with reference to FIG. 18. According to the present embodiment, the motor M is controlled on the basis of the relative angular displacement of the stabilizer bars, so that the output of the motor M acts in a direction against the inertia force of the vehicle body, and that the motor control is allowed when the roll moment produced by the stabilizer is increased. On the contrary, in the case where the output of the motor M acts in the same direction as the inertia force of the vehicle body, the motor control is prohibited when the roll moment produced by the stabilizer is decreased. That is, in the direction for increasing the relative angular displacement of the stabilizer bars, the motor control is allowed, whereas, in the direction for decreasing the relative angular displacement of the stabilizer bars, the motor control is prohibited, thereby to reduce the energy consumption of the motor M and restrain the heat from being generated.

Figure 18:
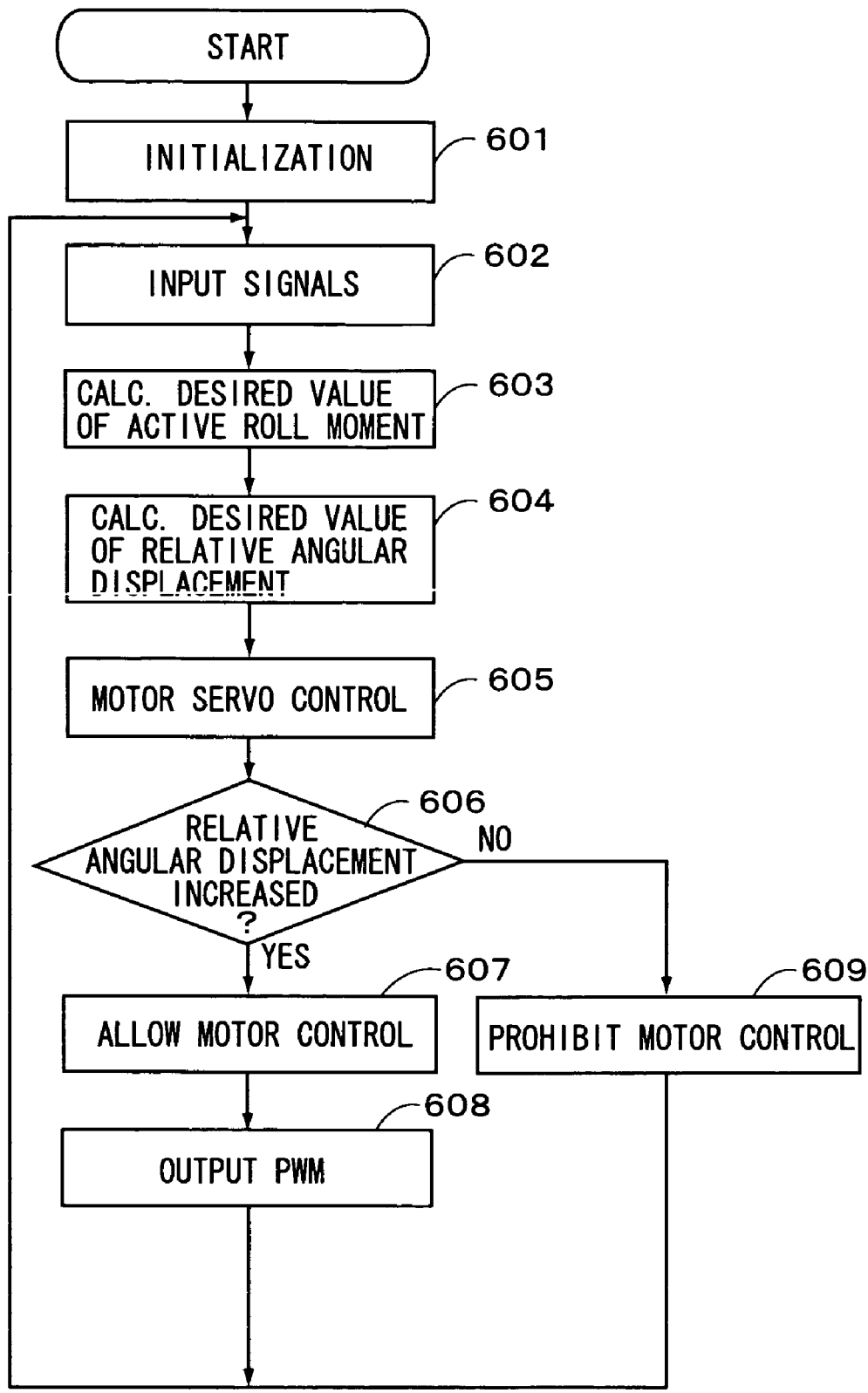
FIG. 18 is a flow chart showing a control for allowing or prohibiting a motor control on the basis of increase or decrease of a relative angular displacement of stabilizer bars according to yet further embodiment of the present invention.

In FIG. 18, the program provides for initialization of the system at Step 601, and the signals including the actual value (φa) of relative angular displacement of the stabilizer bars, which includes both of the actual value (φaf) for the front stabilizer and the actual value (φar) for the rear stabilizer, and communication signals are read at Step 602. On the basis of those signals, the desired values (Rmf) and (Rmr) of active roll moment are calculated at Step 603. Then, the desired value (φt) of relative angular displacement of the stabilizer bars, which includes both of the desired value (φtf) for the front stabilizer and the desired value (φtr) for the rear stabilizer, is obtained at Step 604, on the basis of the desired values (Rmf) and (Rmr) of active roll moment, as described before. Then, at Step 605, the motor servo control is made on the basis of the desired value (φt) and actual value (φa) of relative angular displacement of the stabilizer bars as shown in FIG. 12, and the PWM output is calculated. That is, the motor servo control is performed in response to the deviation of relative angular displacement, so that the motor M is actuated to reduce the deviation. Then, it is determined at Step 606 whether the relative angular displacement of the stabilizer bars is increased with the motor M actuated. If it is determined that the motor M is controlled to increase the relative angular displacement of the stabilizer bars, the program proceeds to Step 607 where the motor control is allowed, and further proceeds to Step 608 where the PWM output is fed to the motor drive circuit CT. That is, in the case where the deviation of relative angular displacement of the stabilizer bars is produced, and it is required to increase the relative angular displacement of stabilizer bars, so that the motor M has to be actuated to reduce the deviation, then the supply of the electric current to the motor M is allowed. On the contrary, if it is determined at Step 606 that the motor M is controlled to decrease the relative angular displacement of the stabilizer bars, the program proceeds to Step 609 where the motor control is prohibited, so that the electric current is not fed to the motor M. That is, in the case where the deviation of relative angular displacement of the stabilizer bars is required to be decreased, simply the supply of electric current to the motor M is terminated, without controlling the motor M to be actuated in the reverse direction, so that the force for holding the stabilizer bars is released.

Figure 19:
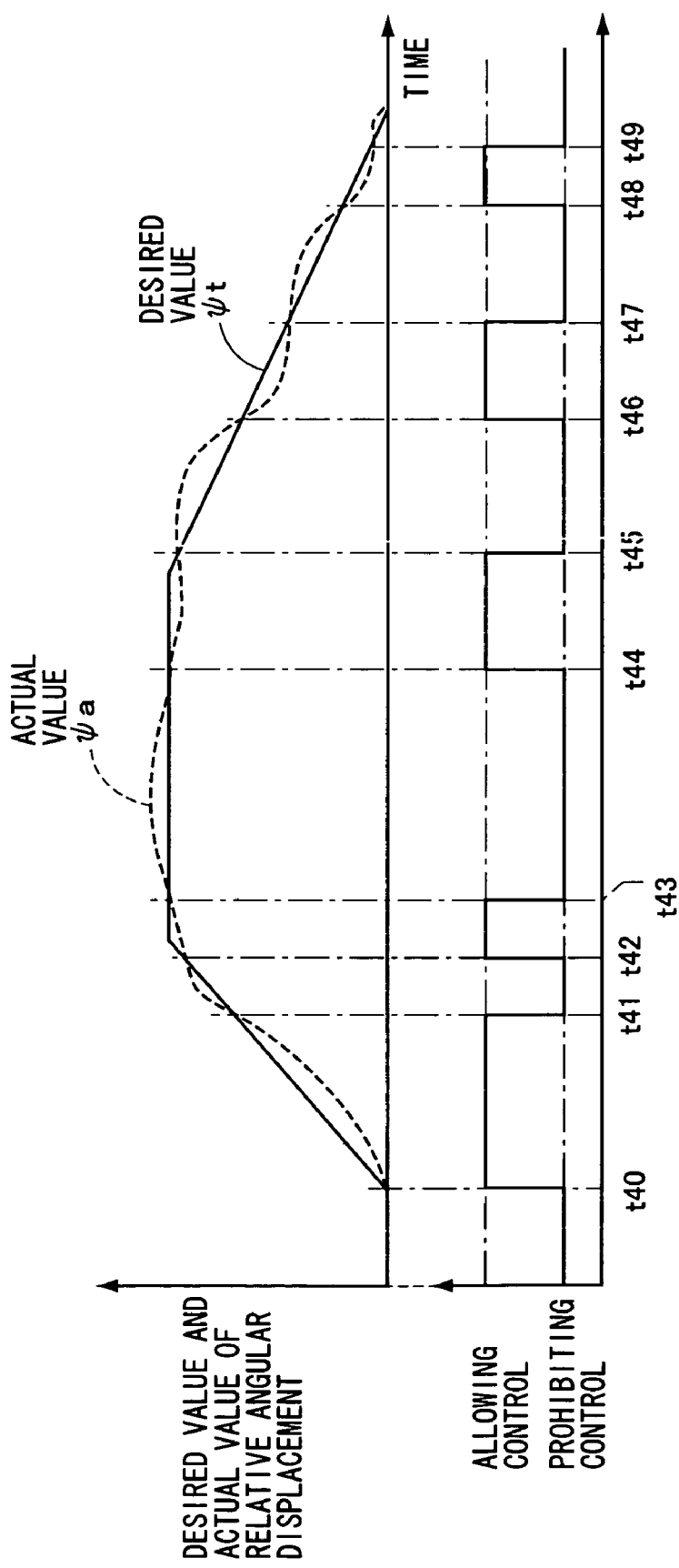
FIG. 19 is a time chart showing an example of operation of the control performed as shown in FIG. 18.

FIG. 19 shows a time chart of an example performed by the embodiment as shown in FIG. 18, wherein it is not determined whether the turning operation is being decreased, unlike the previous embodiments as shown in FIG. 8 and so on, so that it will operate even when the turning operation is being increased or held. In FIG. 19, the vehicle is moving straight forward by the time "t40", so that the motor M is prohibited from being actuated. If the vehicle begins to be turned at the time (t40), the desired value (φt) will be greater than the actual value (φa) (i.e., φt>φa) due to a time lag of the control or the like, so that the motor M will be allowed to be actuated, thereby to output torque for increasing the relative angular displacement of the stabilizer bars. Then, if the desired value (φt) is equal to or smaller than the actual value (φa) (i.e., φt≦φa) at the time (t41), the motor M will be prohibited from being actuated. In this case, supposing that the motor M is not prohibited from being actuated, the motor M is controlled on the basis of the deviation between the desired value (φt) and actual value (φa) as shown in FIG. 12, the sign of the deviation is reversed at the time (t41), and the direction of electric current fed to the motor M is reversed, as well. However, it is not required to actuate the motor M in a direction for reversing the relative angular displacement of the stabilizer bars. In this case, therefore, it is not required to feed the electric current to the motor M, so that the motor control is prohibited to release the force for holding the relative angular displacement of the stabilizer bars, thereby to prevent the relative angular displacement from being increased. Then, if the condition of [φt>φa] is fulfilled again at the time (t42), the motor M will be allowed to be actuated. Thereafter, the above-described cycle will be repeated until the time (t49), to control the apparatus so that the actual value of the relative angular displacement of the stabilizer bars will follow the desired value thereof. According to the present embodiment, therefore, the motor M is allowed to be actuated in order to increase the relative angular displacement of the stabilizer bars, whereas, in order to decrease the relative angular displacement of the stabilizer bars, the motor M is prohibited, so that the electric current is not fed to the motor M, to reverse the stabilizer bars toward their original positions by means of external force. As a result, the energy consumption can be reduced and the heat load of the motor M and electronic controller ECU can be reduced.

Figure 20:
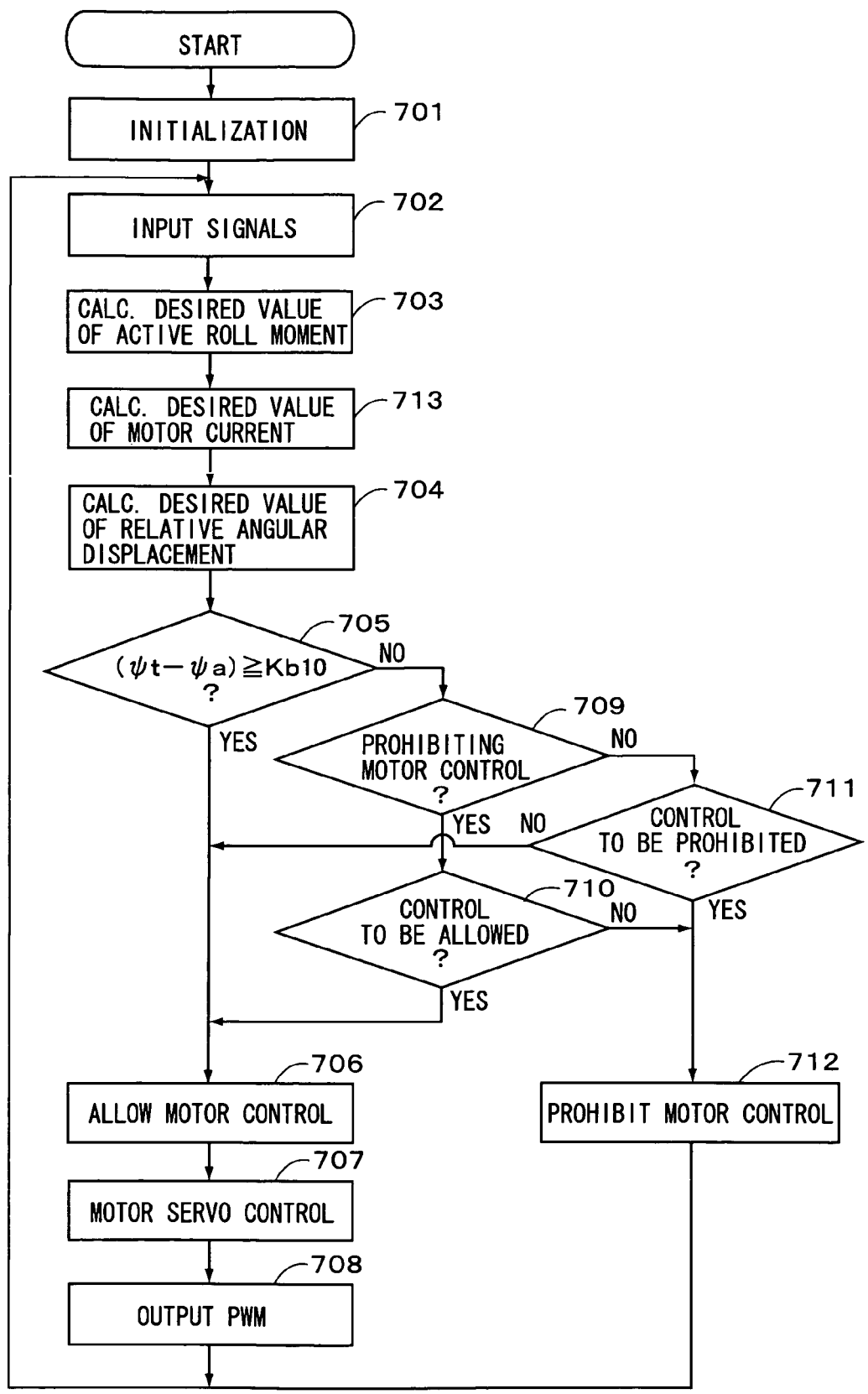
FIG. 20 is a flow chart showing a control for allowing or prohibiting a motor control on the basis of a relative angular deviation of stabilizer bars, according to the embodiment for performing the motor control on the basis of the desired value of motor current as shown in FIG. 7.
Figure 21:
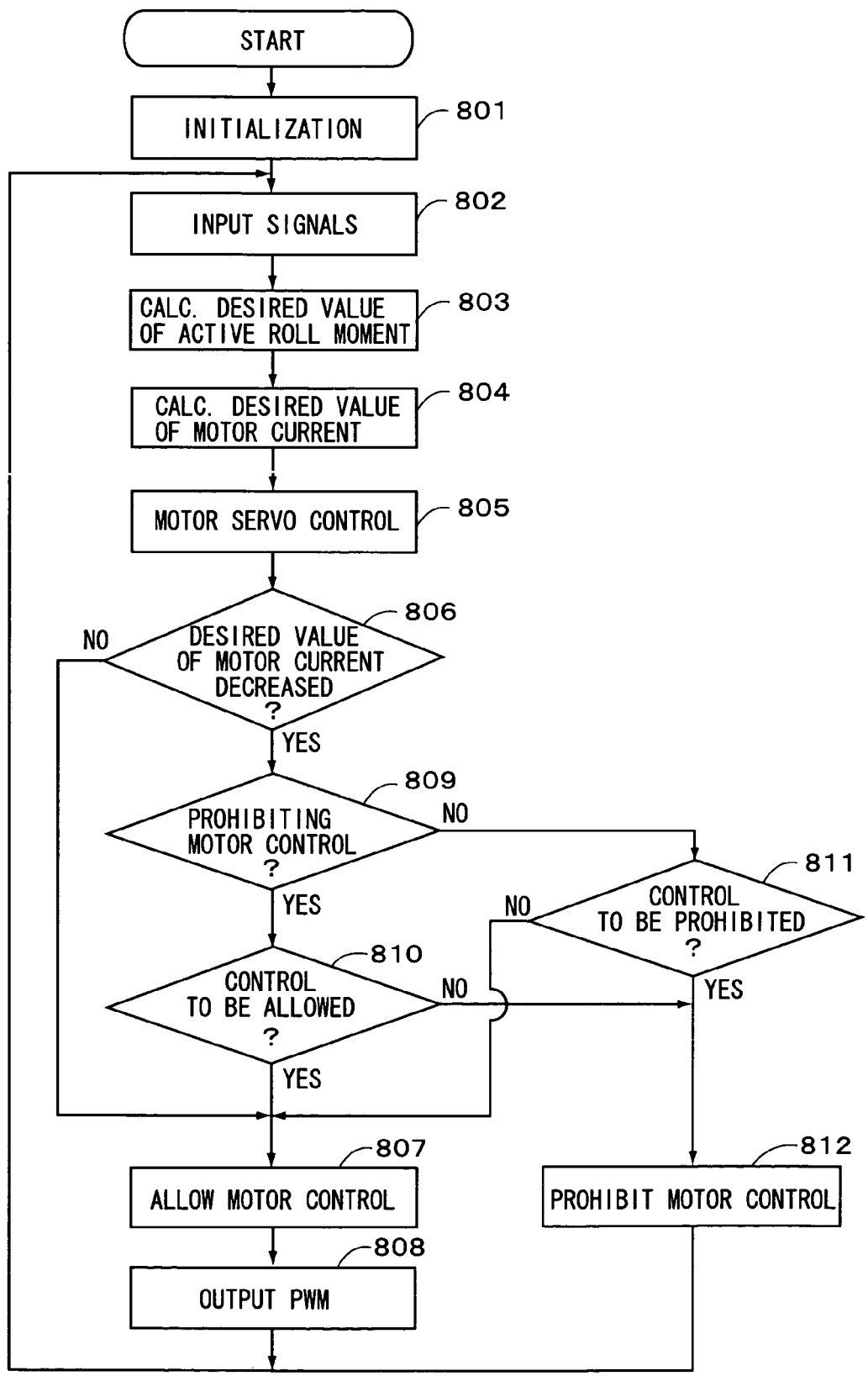
FIG. 21 is a flow chart showing a control for performing the motor control on the basis of the desired value of motor current, and allowing or prohibiting the motor control on the basis of increase or decrease of the desired value of motor current, according to the embodiment for performing the motor control on the basis of the desired value of motor current as shown in FIG. 7.

FIGS. 20 and 21 relate to a further embodiment in combination of the embodiment as shown in FIGS. 16 and 18, wherein it is determined whether the motor M is to be actuated on the basis of the relative angular displacement of the stabilizer bars, and the embodiment as shown in FIGS. 7-11, wherein the motor M is controlled on the basis of the desired value of electric current fed to it. At the outset, according to the embodiment as shown in FIG. 20, the motor M is controlled on the basis of the desired value of motor current as shown in FIG. 7, unlike the embodiment as shown in FIG. 16, whereas the change of [allowing motor control] or [prohibiting motor control] is made on the basis of the relationship in gratitude between the desired value (φt) and the actual value (φa) of relative angular displacement of the stabilizer bars, in the same manner as shown in FIG. 16. That is, Steps 701-712 as shown in FIG. 20 correspond to Steps 501-512 as shown in FIG. 16, respectively, and Step 713 is provided between Step 703 and Step 704. On the basis of the desired values (Rmf) and (Rmr) of active roll moment set at Step 703, the desired value of electric current fed to the motor M for actuating the same is calculated at Step 713, and the desired value (φt) of relative angular displacement of the stabilizer bars, which includes both of the desired value (φtf) for the front stabilizer and the desired value (φtr) for the rear stabilizer, is obtained at Step 704. Therefore, the motor servo control performed at Step 707 is different from that performed at Step 507, and it is performed on the basis of the desired value of motor current obtained at Step 713. At Step 705, the desired value (φt) of relative angular displacement of the stabilizer bars is compared with the actual value (φa). If the condition of [(φt−φa)≧Kb10] is fulfilled, the program proceeds to Step 706 where the motor control is allowed, whereas, if the condition of [(φt−(φa)<Kb10] is fulfilled, the program proceeds to Step 709, and then to Steps 710-712 so as to be performed in the same manner as Steps 510-512. "Kb10" is a predetermined value for determining the threshold value, like "Kb0" in FIG. 16, and "Kb11-Kb16" are employed at Steps 710 and 711, instead of "Kb1-Kb6" employed at Steps 510 and 511, to be used in the same manner.

Next, according to the embodiment as shown in FIG. 21, the motor M is controlled at Step 805 on the basis of the desired value of motor current, unlike the embodiment as shown in FIG. 18. Then, if it is determined at Step 806 that the desired value of motor current is held or increased, the program proceeds to Step 807 where the motor control is allowed, whereas if it is determined that the desired value of motor current is decreased, the program proceeds to Steps 809-811, and then to Step 812 where the motor control is prohibited. That is, according to the embodiment as shown in FIG. 18, if it is determined at Step 606 that the relative angular displacement of the stabilizer bars is controlled to be decreased, the program immediately proceeds to Step 609 where the motor control is prohibited. On the contrary, according to the embodiment as shown in FIG. 21, if it is determined at Step 806 that the desired value of motor current is decreased, there may be a case where convergence of turning operation will not coincide with convergence of rolling motion, so that the program proceeds Steps 809-811, where it is determined whether the motor control is to be prohibited, on the basis of the relative angular displacement of the stabilizer bars.

With respect to the determination made at Step 806 in FIG. 21, the desired value of motor current is determined on the basis of the condition of the turning operation of the vehicle, to result in achieving the same effect as the determination of the turning operation as shown (at Step 106) in FIG. 8. In other words, the determination of turning operation made in the embodiment as shown in FIG. 8 is the determination made in the input system, whereas the determination of reduction of the desired value of motor current made in the embodiment as shown in FIG. 21 is the determination made in the output system. In terms of the reference for controlling the motor M, the control according to motor current is performed in the embodiments as shown in FIGS. 8-11, and FIGS. 20 and 21, whereas the control according to the deviation of relative angular displacement of stabilizer bars is performed in the embodiments as shown in FIGS. 13 and 14, and FIGS. 16-19.

In the embodiments as described above, what the motor control is to be prohibited is meant by the case where the electric current is not fed to the motor M. For example, if the desired value provided for controlling the motor M is set to be zero, or a control gain for use in the motor control is set to be zero, the current can be prohibited from being fed to the motor M. Furthermore, in the case where the motor control is to be prohibited according to the each embodiment as described above, the electric current is prohibited from being fed to the motor M. In this case, the output with a low duty ratio may be used, without completely prohibiting the current from being fed to the motor M, thereby to substantially prohibit the current from being fed to it. Or, the output with a low duty ratio may be maintained for a certain time period, and then the electric current is stopped to be fed to the motor M. According to the output with a low duty ratio, when the motor control is changed from [prohibiting motor control] to [allowing motor control], follow-up performance can be improved, and also, when the motor control is changed from [allowing motor control] to [prohibiting motor control], rapid change of rolling motion can be effectively restrained.

It should be apparent to one skilled in the art that the above-described embodiment are merely illustrative of but a few of the many possible specific embodiments of the present invention. Numerous and various other arrangements can be readily devised by those skilled in the art without departing from the spirit and scope of the invention as defined in the following claims.

What is claimed is:

1. A stabilizer control apparatus for a vehicle, comprising:
   a stabilizer including a pair of stabilizer bars disposed between a right wheel and a left wheel of said vehicle, and an actuator having an electric motor disposed between said stabilizer bars;
   turning determination means for determining a turning operation of said vehicle; and control means for controlling said electric motor in response to the turning operation determined by said turning determination means, wherein said control means substantially prohibits said electric motor from being fed with electric current, when said turning determination means determines that the turning operation of said vehicle is being decreased.

2. A stabilizer control apparatus for a vehicle, comprising:
a stabilizer including a pair of stabilizer bars disposed between a right wheel and a left wheel of said vehicle, and an actuator having an electric motor disposed between said stabilizer bars;
relative angular displacement detection means for detecting a relative angular displacement between said stabilizer bars;
desired value setting means for setting a desired value of relative angular displacement between said stabilizer bars, in response to a turning operation of said vehicle; and
control means for controlling said electric motor in response to the desired value of relative angular displacement set by said desired value setting means, wherein said control means substantially prohibits said electric motor from being fed with electric current, when said control means determines that the relative angular displacement detected by said relative angular displacement detection means is greater than the desired value of relative angular displacement set by said desired value setting means, by a predetermined value.

3. A stabilizer control apparatus for a vehicle, comprising:
a stabilizer including a pair of stabilizer bars disposed between a right wheel and a left wheel of said vehicle, and an actuator having an electric motor disposed between said stabilizer bars;
relative angular displacement detection means for detecting a relative angular displacement between said stabilizer bars; and
control means for controlling said electric motor in response to the relative angular displacement detected by said relative angular displacement detection means, wherein said control means substantially prohibits said electric motor from being fed with electric current, when said control means decreases the relative angular displacement.

4. A stabilizer control apparatus for a vehicle, comprising:
a stabilizer including a pair of stabilizer bars disposed between a right wheel and a left wheel of said vehicle, and an actuator having an electric motor disposed between said stabilizer bars;
desired current setting means for setting desired electric current fed to said electric motor for actuating said electric motor; and
control means for controlling said electric motor in response to the desired electric current set by said desired current setting means, wherein said control means substantially prohibits said electric motor from being fed with electric current, when said control means decreases the desired electric current.

5. A stabilizer control apparatus as set forth in claim 1, wherein said control means substantially prohibits said electric motor from being fed with electric current, by setting a desired value provided for controlling said electric motor to be approximately zero.

6. A stabilizer control apparatus as set forth in claim 1, wherein said control means substantially prohibits said electric motor from being fed with electric current, by setting a control gain provided for controlling said electric motor to be approximately zero.

7. A stabilizer control apparatus as set forth in claim 1, wherein said control means substantially prohibits said electric motor from being fed with electric current, by decreasing a duty ratio for controlling the electric current fed to said electric motor.

8. A stabilizer control apparatus as set forth in claim 7, wherein said control means decreases the duty ratio for a certain time period, and then stops feeding the electric current to said electric motor.

9. A stabilizer control apparatus as set forth in claim 1, wherein said turning determination means includes means for obtaining a lateral acceleration of said vehicle, and means for differentiating the lateral acceleration to obtain a variation thereof, and wherein said turning determination means determines the turning operation of said vehicle on the basis of the lateral acceleration and the variation thereof.

* * * * *